(12) United States Patent
Edge et al.

(10) Patent No.: US 11,544,406 B2
(45) Date of Patent: Jan. 3, 2023

(54) PRIVACY-PRESERVING DATA PLATFORM

(71) Applicant: Microsoft Technology Licensing, LLC, Redmond, WA (US)

(72) Inventors: Darren Keith Edge, Cambridge (GB); Weiwei Yang, Seattle, WA (US); Kateryna Lytvynets, Redmond, WA (US); Christopher Miles White, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 343 days.

(21) Appl. No.: 16/869,170

(22) Filed: May 7, 2020

(65) Prior Publication Data
US 2021/0248267 A1 Aug. 12, 2021

Related U.S. Application Data

(60) Provisional application No. 62/971,637, filed on Feb. 7, 2020.

(51) Int. Cl.
*G06F 21/00* (2013.01)
*G06F 21/62* (2013.01)
(Continued)

(52) U.S. Cl.
CPC ........ *G06F 21/6254* (2013.01); *G06F 3/0482* (2013.01); *G06F 16/2462* (2019.01);
(Continued)

(58) Field of Classification Search
CPC ............... G06F 21/6254; G06F 3/0482; G06F 16/2462; G06K 9/6256; G06K 9/6282; G06K 9/6267; G06N 20/00; G06N 5/003
See application file for complete search history.

(56) References Cited

U.S. PATENT DOCUMENTS

2006/0123461 A1 6/2006 Lunt et al.
2008/0222319 A1 9/2008 Sato et al.
(Continued)

FOREIGN PATENT DOCUMENTS

WO WO-2022013879 A1 * 1/2022

OTHER PUBLICATIONS

"2019 Trafficking in Persons Report", In US Department of State, Jun. 2019, 86 Pages.
(Continued)

*Primary Examiner* — Kendall Dolly
(74) *Attorney, Agent, or Firm* — Workman Nydegger

(57) ABSTRACT

Techniques for synthesizing and analyzing data are disclosed. A ML model anonymizes microdata to generate synthesized data. This anonymizing is performed by reproducing attributes identified within microdata and by applying constraints to prevent rare attribute combinations from being reproduced in the synthesized data. User input selects attributes to filter the synthesized data, thereby generating a subset of records. A UI displays a synthesized aggregate count representing how many records are in the subset. Pre-computed aggregate counts are accessed to indicate how many records in the microdata embody certain attributes. Based on the user input, there is an attempt to identify a particular count from the pre-computed aggregate counts. This count reflects how many records of the microdata would remain if the selected attributes were used to filter the microdata. That count is displayed along with the synthesized aggregate count. The two counts are juxtaposed next to one another.

20 Claims, 15 Drawing Sheets

(51) Int. Cl.
G06K 9/62 (2022.01)
G06F 3/0482 (2013.01)
G06N 20/00 (2019.01)
G06F 16/2458 (2019.01)

(52) U.S. Cl.
CPC ......... *G06K 9/6256* (2013.01); *G06K 9/6282* (2013.01); *G06N 20/00* (2019.01)

(56) References Cited

U.S. PATENT DOCUMENTS

| | | | | |
|---|---|---|---|---|
| 2021/0004671 | A1* | 1/2021 | Brill | G06N 3/08 |
| 2021/0073287 | A1* | 3/2021 | Hunter | H04L 9/3239 |
| 2021/0158221 | A1* | 5/2021 | Marlin | G06Q 30/0201 |
| 2021/0240737 | A1* | 8/2021 | Fox | G06F 16/2468 |
| 2021/0342707 | A1* | 11/2021 | Xu | G06N 20/20 |
| 2022/0035839 | A1* | 2/2022 | Andres | G06F 21/6254 |

OTHER PUBLICATIONS

"Freedom signal", Retrieved From: https://www.freedomsignal.org/, Aug. 10, 2018, 3 Pages.

"Global Estimates of Modern Slavery: Forced Labour and Forced Marriage", In International Labour Office, Sep. 19, 2017, 68 pages.

"Global Report on Trafficking in Persons", In United Nations publication, Dec. 2018, 90 Pages.

"Regulation (EU) 2016/679 of the European Parliament and of the Council of Apr. 27, 2016 on the protection of natural persons with regard to the processing of personal data and on the free movement of such data, and repealing Directive 95/46/EC", Retrieved from: https://eur-lex.europa.eu/eli/reg/2016/679/2016-05-04, Apr. 27, 2016, 78 Pages.

"The Counter Trafficking Data Collaborative Global Data Hub on Human Trafficking", Retrieved from: https://web.archive.org/web/20191229151104/https://www.ctdatacollaborative.org/, Dec. 29, 2019, 6 Pages.

"Traffic Jam", Retrieved From: https://web.archive.org/web/20190112230014/https://www.marinusanalytics.com/traffic-jam, Jan. 12, 2019, 2 Pages.

Abay, et al., "Privacy preserving synthetic data release using deep learning", In Joint European Conference on Machine Learning and Knowledge Discovery in Databases, Sep. 10, 2018, pp. 1-16.

Adam, et al., "Security-control methods for statistical databases: a comparative study", In Journal of Computing Surveys (CSUR), vol. 21, Issue 4, Dec. 1, 1989, pp. 515-556.

Aggarwal, Charu C., "On k-anonymity and the curse of dimensionality", In Proceedings of the 31st International Conference on Very Large Data Bases, Aug. 30, 2005, pp. 901-909.

Barak, et al., "Privacy, Accuracy, and Consistency Too: A Holistic Solution to Contingency Table Release", In Proceedings of the 26th Symposium on Principles of Database Systems, Jun. 11, 2007, pp. 273-281.

Bindschaedler, et al., "Plausible deniability for privacy-preserving data synthesis", In Proceedings of the VLDB Endowment, vol. 10, Issue 5, Aug. 26, 2017, pp. 1-17.

Charest, Anne-Sophie, "How can we analyze differentially-private synthetic datasets?", In Journal of Privacy and Confidentiality vol. 2, No. 2, Apr. 1, 2011, pp. 21-33.

Chen, et al., "Differentially private high-dimensional data publication via sampling-based inference", In Proceedings of the 21th ACM SIGKDD International Conference on Knowledge Discovery and Data Mining, Aug. 10, 2015, pp. 129-138.

Dalenius, Tore, "Towards a methodology for statistical disclosure control", In Journal of statistik Tidskrift, vol. 15, Jan. 3, 1977, pp. 429-444.

Darnton, et al., "Tech Against Trafficking", Retrieved from: https://web.archive.org/web/20190802212723/https://www.bsr.org/en/collaboration/groups/tech-against-trafficking, Aug. 2, 2019, 8 Pages.

Deeb-Swihart, et al., "Understanding law enforcement strategies and needs for combating human trafficking", In Proceedings of the CHI Conference on Human Factors in Computing Systems, May 4, 2019, pp. 1-14.

Dwork, et al., "Calibrating Noise to Sensitivity in Private Data Analysis", In Proceedings of the Third conference on Theory of Cryptography, vol. 3876, Mar. 4, 2006, pp. 265-284.

Dwork, Cynthia, "Differential Privacy", In Proceedings of the 33rd International Colloquium on Automata, Languages and Programming, Part II, Jul. 2006, 12 Pages.

Dwork,, et al., "Our Data, Ourselves: Privacy via Distributed Noise Generation", In Proceedings of the 24th Annual International Conference on the Theory and Applications of Cryptographic Techniques, May 28, 2006, pp. 486-503.

Edge, et al., "Beyond tasks: An activity typology for visual analytics", In Journal of IEEE transactions on visualization and computer graphics, vol. 24, Issue 1, Jan. 2018, pp. 267-277.

Engestrom, Yrjo, "Learning by expanding: An activity-theoretical approach to developmental research", In Publication of Cambridge University Press, 1987, 269 Pages.

Erlingsson, et al., "RAPPOR: Randomized Aggregatable Privacy-Preserving Ordinal Response", In Proceedings of the ACM SIGSAC Conference on Computer and Communications Security, Nov. 3, 2014, pp. 1054-1067.

Evans, et al. "Statistically Valid Inferences from Privacy Protected Data", In Working Paper., Dec. 7, 2019, 35 Pages.

Frigerio, et al., "Differentially private generative adversarial networks for time series, continuous, and discrete open data", In IFIP International Conference on ICT Systems Security and Privacy Protection, Jun. 25, 2019, pp. 1-18.

Gaboardi, et al., "PSI (?): a Private data Sharing Interface", In Journal of Computing Research Repository, Sep. 2016, 18 Pages.

Hall, et al., "TellFinder: Discovering Related Content in Big Data", In VIS Practitioner Session, Jul. 2015, 3 Pages.

Howe, et al., "Synthetic data for social good", In Journal of Computing Research Repository, Oct. 2017, 8 Pages.

Johnson, et al., "Towards practical differential privacy for SQL queries", In Proceedings of the VLDB Endowment, vol. 11, Issue 5, Jan. 2018, pp. 526-539.

Kejriwal, et al., "Technology-assisted Investigative Search: A Case Study from an Illicit Domain", In Extended Abstracts of the CHI Conference on Human Factors in Computing Systems, Apr. 21, 2018, pp. 1-9.

Li, et al., "DPSynthesizer: Differentially Private Data Synthesizer for Privacy Preserving Data Sharing", In Proceedings VLDB Endowment, vol. 7, Issue 13, Aug. 2014, pp. 1-12.

Li, et al., "t-Closeness: Privacy Beyond k-Anonymity and !-Diversity", In Proceedings of IEEE 23rd International Conference on Data Engineering, Apr. 15, 2007, pp. 1-10.

Liu, et al., "A novel privacy preserving method for data publication", In Journal of Information Sciences, vol. 501, Oct. 2019, pp. 421-435.

Machanavajjhala, et al., "l-diversity: Privacy beyond k-anonymity", In Journal of ACM Transactions on Knowledge Discovery from Data, vol. 1 , Issue 1, Mar. 2007, pp. 1-52.

Mcsherry, Frank, "Privacy Integrated Queries: An Extensible Platform for Privacy-Preserving Data Analysis", In Journal of Communications of the ACM, vol. 53, No. 9, Sep. 2010, pp. 89-97.

Nergiz, et al., "Hiding the presence of individuals from shared databases", In Proceedings of the ACM SIGMOD international conference on Management of data, Jun. 12, 2007, pp. 665-676.

Ping, et al., "DataSynthesizer: Privacy-preserving synthetic datasets", In Proceedings of the 29th International Conference on Scientific and Statistical Database Management, Jun. 27, 2017, 5 Pages.

Pirolli, et al., "Information foraging", In Journal of Psychological review, vol. 106, Issue 4, Jan. 1999, 84 Pages.

Prasser, "Putting statistical disclosure control into practice: The ARX data anonymization tool", In Medical Data Privacy Handbook, Jan. 2015.

Qardaji, et al., "PriView: Practical differentially private release of marginal contingency tables", In Proceedings of the ACM SIGMOD international conference on Management of data, Jun. 22, 2014, pp. 1435-1446.

(56) References Cited

OTHER PUBLICATIONS

Quick, Harrison, "Generating Poisson-Distributed Differentially Private Synthetic Data", In Publication of arXiv preprint arXiv:1906.00455, Jun. 2, 2019, pp. 1-23.
Raab, et al., "Practical data synthesis for large samples", In Journal of Privacy and Confidentiality, vol. 7, Issue 3, 2016, pp. 67-97.
Rubin, Donald B., "Statistical disclosure limitation", In Journal of official Statistics, vol. 9, Issue 2, 1993, pp. 461-468.
Sedlmair, et al., "Design study methodology: Reflections from the trenches and the stacks", In Journal of IEEE transactions on visualization and computer graphics, vol. 18, Issue 12, Dec. 2012, pp. 2431-2440.
Shneiderman, Ben, "The eyes have it: A task by data type taxonomy for information visualizations", In Proceedings of IEEE symposium on visual languages, Sep. 1996, pp. 1-8.
Sholmo, et al., "Privacy protection from sampling and perturbation in survey microdata", In Journal of Privacy and Confidentiality, vol. 4, Issue 1, Sep. 2012, 13 Pages.
Snoke, et al., "pMSE Mechanism: Differentially Private Synthetic Data with Maximal Distributional Similarity", In International Conference on Privacy in Statistical Databases, Sep. 26, 2018, 16 Pages.
Sweeney, Latanya, "Achieving k-anonymity privacy protection using generalization and suppression", In International Journal of Uncertainty, Fuzziness and Knowledge-Based Systems 10, No. 05, Oct. 10, 2002, pp. 571-588.
Sweeney, Latanya, "Computational disclosure control: a primer on data privacy protection", In Doctoral dissertation, Massachusetts Institute of Technology, May 2001, 217 Pages.
Sweeney, et al., "Guaranteeing anonymity when sharing medical data, the Datafly system", In Proceedings of the AMIA Annual Fall Symposium, 1997, pp. 51-55.
Sweeney, Latanya, "K-Anonymity: a Model for Protecting Privacy", In International Journal on Uncertainty, Fuzziness and Knowledge-based Systems, vol. 10, Issue 5, Oct. 2002, pp. 1-14.
Tukey, J. W., "Exploratory Data Analysis", in Publication of Addison-Wesley, 1977, pp. 5-23.
Wang, et al., "Optimizing Locally Differentially Private Protocols", In Journal of Computing Research Repository, May 2017, pp. 1-16.
Warner, Stanley L.., "Randomized response: A survey technique for eliminating evasive answer bias", In Journal of the American Statistical Association, vol. 60, No. 309, Mar. 1965, 8 Pages.
Xu, et al., "DPPro: Differentially private high-dimensional data release via random projection", In Journal of IEEE Transactions on Information Forensics and Security, vol. 12, Issue 12, Dec. 2017, pp. 3081-3093.
Zaharia, et al., "Apache spark: a unified engine for big data processing", In Journal of Communications of the ACM vol. 59, Issue 11, Nov. 2016, pp. 56-65.
Zhang, et al., "Privbayes: Private data release via bayesian networks", In Journal of ACM Transactions on Database Systems, vol. 42, Issue 4, Oct. 2017, 41 Pages.
"K-anonymity—Wikipedia", Retrieved From: https://en.wikipedia.org/w/index.php?title=Kanonymity&oldid=937924958, Retrieved Date: Mar. 24, 2021, 6 Pages.
"International Search Report and Written Opinion Issued in PCT Application No. PCT/US21/014060", dated Apr. 6, 2021, 15 Pages. (MS# 408141-WO-PCT).

* cited by examiner

PRIVACY-PRESERVING DATA PLATFORM

CROSS-REFERENCE TO RELATED APPLICATIONS

This application claims the benefit of and priority to U.S. Provisional Patent Application Ser. No. 62/971,637 filed on Feb. 7, 2020 and entitled "PRIVACY-PRESERVING DATA PLATFORM," which application is expressly incorporated herein by reference in its entirety.

BACKGROUND

In many domains, there is a need to share and distribute data. By sharing data, analysts (e.g., human analysts or even computer analyzing tools) are able to process the data to identify trends, patterns, or other results. Identifying these results is often quite beneficial because the data can help facilitate decision making processes, resource allocations, or even policy decisions. By way of example, the healthcare industry often relies on the results collected from large data samples or tests to determine healthcare trends and other healthcare related events.

Although sharing data is very useful, laws are in place to restrict which kinds of data are permitted to be released and distributed. For instance, personally identifiable information (PII), which is data that may be used to specifically identify a particular person, is often regulated by law. Examples of PII include, but certainly are not limited to, a person's social security number, banking information, driver's license information, passport information, age, gender, citizenship, and so forth. Generally, there are different types or levels of personal data that are controlled by regulation. These types include "identified data," "identifiable data," and "deidentified data." These types of data are often grouped together using the term "microdata" and refer to scenarios in which a record of any one of these different data types corresponds to a natural person or individual.

In contrast to microdata, so-called "aggregate data" is not regulated because it is not considered to be personal or sensitive in nature. Aggregate data is often collected or combined from multiple measurements or even bodies of microdata. Observations that are identified within the aggregate data can then be replaced with summary statistics, thereby effectively distinguishing, separating, or anonymizing the generalized statistics relative to any particular individual.

Numerous techniques are currently available to anonymize data. In general, there are several standard strategies that may be employed to anonymize data. One strategy is referred to as "de-identification" in which PII is stripped out of an original data set. In essence, this strategy replaces actual identities with pseudo random strings acting as pseudonyms within a data set. Another strategy is referred to as "k-anonymity," which is often used in the healthcare industry. Of course, numerous other strategies and techniques are available.

Unfortunately, however, many of these techniques are still not sufficient to prevent a malicious actor, who has additional background information, from being able to link other bits of data to the background knowledge (or perhaps to some other external database) to either identify which record potentially represents an individual or to make a probable inference about whether or not the individual is represented in the data set. For example, suppose a malicious entity was privy to certain background information about a particular person. That malicious entity could take its own background information and compare it against the de-identified information to potentially make additional correlations or inferences. In some cases, the entity may be able to filter the de-identified information down to a sufficient granularity, thereby enabling the entity to make a reasoned inference as to whether or not a particular person's data was included in the original data set (i.e. "connecting the dots" so-to-speak).

Accordingly, although there are numerous techniques available to attempt to anonymize data, there is still an on-going need to improve these techniques. For instance, there is a substantial need to protect against the residual risk of enabling malicious entities to re-identify individuals even after PII removal and/or de-identification. There is also a substantial need to prevent privacy risk or privacy leakage, even for de-identified information. Additionally, there is a substantial need to help gather or determine insights from the anonymized data. Indeed, even after data has been anonymized, there is still a substantial hurdle in that the data must then be analyzed to identify the trends, behaviors, and other patterns in that data. Furthermore, difficulties arise as to determining whether or not statistics derived from the anonymized data accurately reflect real-world events or attributes included in the original sensitive data set.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The embodiments disclosed herein relate to systems, devices, and methods that facilitate improved confidence in an accuracy relating to statistics derived from synthetic data generated from sensitive microdata.

In some embodiments, synthesized data is generated by anonymizing microdata using a machine learning (ML) model. The ML model generates the synthesized data by reproducing (e.g., within the synthesized data) identified attributes that are identified from within the microdata. The synthesized data is also generated by applying or implementing a set of constraints. Use of these constraints prevents rare combinations of the attributes from being reproduced in the synthesized data. Notably, these combinations of attributes are combinations that satisfy a rarity threshold within the microdata. Additionally, the embodiments receive (e.g., within a user interface (UI)), user input selecting, from among the attributes, specific attributes. When these specific attributes are selected, they operate to filter the synthesized data, thereby generating a subset of data records. Here, each record in the subset embodies a combination of the selected attributes. The embodiments then display (e.g., also within the UI) a resulting synthesized aggregate "count." This count represents a number of records included in the subset of data records. A set of pre-computed aggregate counts are also accessed. These counts indicate how many records in the microdata embody specific ones of the attributes or embody specific selected combinations of the attributes. Based on the user input, the embodiments then attempt to identify, from the set of pre-computed aggregate counts, a particular count corresponding to the selected specific attributes. This particular count reflects how many records of the microdata would remain if the same selected specific attributes were used to filter the microdata. If the particular count is identified, then the embodiments display the particular count simultaneously with the resulting synthesized aggregate count. As a consequence, the particular count is juxtaposed for comparison next to the resulting synthesized aggregate count in the UI. This layout of the user interface facilitates juxtaposed comparison to determine how closely the resulting synthesized aggregate count correlates to or matches the particular count, thereby providing assurance or increased confidence regarding statistics derived from the synthesized data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
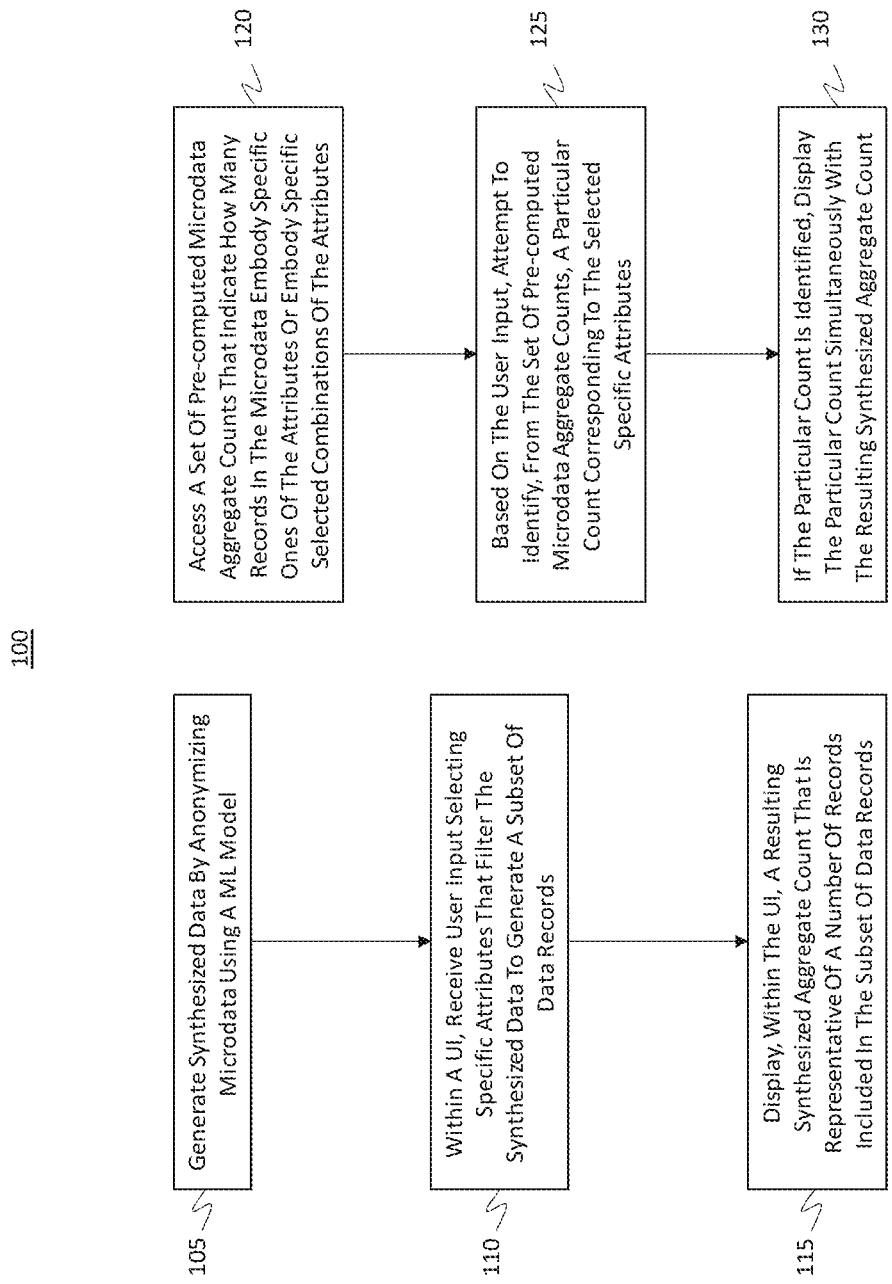
FIGS. 1A and 1B illustrate flowcharts of an example method that facilitates improved confidence in an accuracy relating to statistics derived from synthetic data generated from PII or other forms of microdata.

The embodiments disclosed herein facilitate improved confidence related to the accuracy of statistics derived from synthetic data generated from microdata. As used herein, the term "microdata" should be interpreted broadly to include any type of sensitive data or PII, regardless of whether the PII is related to a natural person or even if it is related to a non-natural person, such as a business entity. Additionally, the phrase "synthetic data" generally refers to artificially generated data that is generated based on real-world data (e.g., PII).

In some embodiments, a ML model anonymizes microdata to generate synthesized data. This anonymizing is performed by reproducing (e.g., within the synthesized data) identified attributes included within the microdata and by applying constraints that, among other things, prevent rare combinations of the attributes from being reproduced in the synthesized data. User input selects specific attributes from within a UI. These selected attributes operate to filter the synthesized data, thereby generating a subset of data records. Each record in the subset embodies a combination of the selected attributes. The UI then displays a resulting synthesized aggregate count representing how many records are in the subset. A set of pre-computed aggregate counts are accessed, where these counts indicate how many records in the microdata embody certain attributes. Based on the user input, the embodiments then attempt to identify, from the set of pre-computed aggregate counts, a particular count corresponding to the selected attributes. This particular count reflects how many records of the microdata would remain if the same selected attributes were used to filter the microdata. If the particular count is identified, then the embodiments display that count with the resulting synthesized aggregate count. As a consequence, the two counts are juxtaposed next to one another for comparison in the UI.

Different types of anonymizing techniques may be used to anonymize the data, so specific details regarding the particularities of anonymizing will not be included herein. The notion of anonymizing data using a ML model that takes into account a set of constraints and other parameters (e.g., decoupling synthesized records from actual individuals or entities), however, is highly beneficial and produces synergistic benefits. As used herein, the term "decouple" and its variants should be interpreted broadly. For instance, test data shows that highly insightful results can be achieved using synthesized datasets that are very similar to the sensitive dataset (e.g., over 90% similar cells). In some cases, the embodiments shuffle the records before saving to a file so that those records no longer represent actual individuals or entities, but each record was originally generated from the initial values for a given individual or entity. Accordingly, the term "decouple" should be interpreted to cover scenarios involving both a close similarity of records (e.g., over 90% similarity) as well as distant similarities (e.g., less than 50% similarity). Thus, using a ML model to anonymize data while respecting the constraints will be discussed in detail herein along with numerous other features.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments beneficially use machine learning (ML) classifiers to learn the statistical properties of input, or so-called "microdata," which may include PII or other sensitive data, in order to generate a synthetic sample dataset (or "synthesized data") that may be used in place of the microdata to preserve privacy when performing statistical analysis. Notably, the records in the synthesized data are designed by the ML model so they do not represent actual individuals or entities; rather, the records represent only statistical probabilities.

Beneficially, the embodiments are able to operate on an algorithmic level by taking the notion of k-anonymity and generalizing that concept to cover all attributes in a data set to generate the synthesized data. As a consequence, there no longer is an artificial distinction between quasi-identifying attributes and sensitive attributes. Generally, k-anonymity holds whenever a record for an individual cannot be distinguished within an equivalence class of at least k records sharing equivalent quasi-identifiers, which are attributes that may be combined to re-identify the individual based on external data or background knowledge. Common quasi-identifiers include demographic information such as gender, date of birth, and zip code.

Beneficially, synthesized records can be rejected and resynthesized if they fail to meet certain constraints, e.g., around the duplication of attribute combinations from the input microdata. A complementary dataset may be created that encodes the difference between aggregate statistics derived from the microdata and synthetic datasets. The disclosed embodiments also beneficially utilize an exploratory user interface configured to allow interactive exploration (e.g., applying attribute filters) of the structure of the synthesized data (aka synthetic data) while simultaneously representing differences between the two datasets (i.e. the synthesized data and the microdata). Advantageously, the disclosed embodiments (i) are able to add differential privacy guarantees, (ii) can be modified to work with graph and log data (and other sparse structures), and (iii) can support arbitrary export from database tables/queries.

The disclosed techniques can be used on any tabular dataset which contains potentially sensitive information to prevent linkage attacks, such as medical, financial, organizational, (user) behavioral, census, and voting data. This allows free and easy sharing of sensitive data and allows for the verification of machine learning (ML) models and results. For example, it is unfortunately often the case that some entities are able to join hospital discharge data with voter registrations to get polling data, such as name and address and medical history of individuals. Releasing medical history is highly undesirable. If the discharged data were processed using the disclosed principles, however, the data will be selectively anonymized so as to prevent the release of sensitive data.

Additional significant benefits and advantages may be realized through the practice of the disclosed principles. For instance, the disclosed embodiments include a specially designed user interface (UI) configured or structured in a specific manner so as to improve the visual display of information and to improve how a user interacts with a computer system. The layouts provided by the disclosed UIs are configured in a specific manner to address problems related to the technical field by providing improved visual layouts for displaying and manipulating anonymized data. Furthermore, the layouts of the disclosed UIs are specifically organized or structured to solve problems related to improving accuracy confidence. That is, the UI is specifically designed to help facilitate improved confidence in the accuracy of any statistics that are derived from the synthesized data because the UI promotes easy juxtaposed comparison between synthetic data metrics and actual data metrics.

Additionally, the disclosed embodiments provide a technical solution to the technical problem of preventing the release or disclosure of sensitive data. As indicated above, practice of the disclosed embodiments helps prevent the unauthorized release of sensitive data because the sensitive data is anonymized in a manner to respect certain predefined constraints, which further facilitate privacy protection. Notwithstanding any anonymization, the embodiments are able to provide statistically relevant information to help perform accurate data analytics.

Whereas prior work has failed to help analysts make sense of data that is not actual data, the disclosed embodiments provide substantial value in this aspect through the use of the disclosed user interface. For instance, the embodiments are able to share insights regarding the correlation between the synthesized data and the microdata without experiencing meaningful privacy leakage. The genesis of these insights does not come from any one specific row of the microdata; rather, the insights come from statistical and structural properties of the microdata as a whole. Further details will be provided later. Accordingly, substantial benefits and advantages may be realized from the practice of the disclosed embodiments.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 1B:
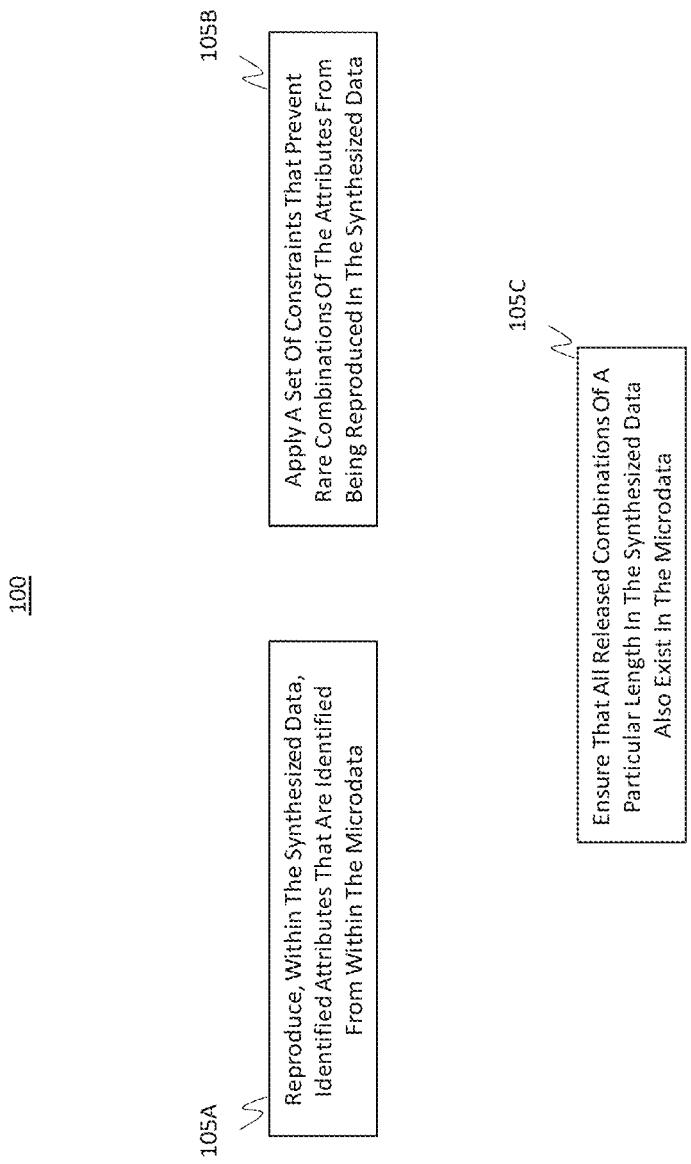

Attention will now be directed to FIGS. 1A and 1B, which illustrate flowcharts of an example method 100 designed to facilitate improvements regarding the confidence in accuracy measurements relating to statistics that are derived from synthetic data, which itself is derived or generated from microdata. To help facilitate the discussion of method 100, frequent reference will be made to the supporting illustrations found in FIGS. 2A through 12.

FIG. 1A shows how method 100 includes an act (act 105) of generating so-called "synthesized data" or "synthetic data." As described earlier, whereas "microdata" embodies real-world events or trends (e.g., a person's PII or other data describing actual events), synthetic data or synthesized data refers to data that is artificially created in order to symbolically represent the trends, patterns, characteristics, or attributes embodied within microdata. In other words, synthesized data is designed to mimic or mirror the attributes identified within microdata, but synthesized data reflects these attributes in a manner so as to decouple records in the microdata from any actual or identified person or entity. Examples of attributes include those that were discussed earlier (e.g., age, gender, etc.) as well as any other characteristic or attribute identifiable within the microdata.

Figure 2A:
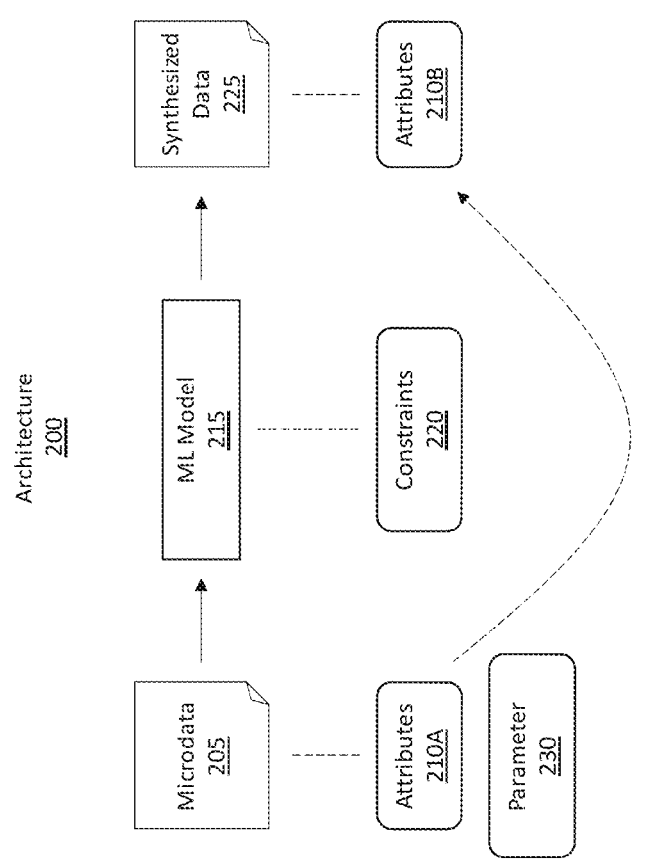
FIGS. 2A and 2B illustrate how a machine learning model may be utilized in a computing architecture to improve how microdata is anonymized and then analyzed.

To generate the synthesized data, a machine learning (ML) model is used. This ML model operates to anonymize the microdata. That is, the ML model is able to generate the synthesized data set and release that data in place of the actual microdata. For instance, FIG. 2A shows an example architecture 200 in which microdata 205, which is representative of the microdata discussed in connection with act 105 and which embodies certain attributes 210A, is fed as input into a ML model 215, which is representative of the ML model in method 100.

Figure 2B:
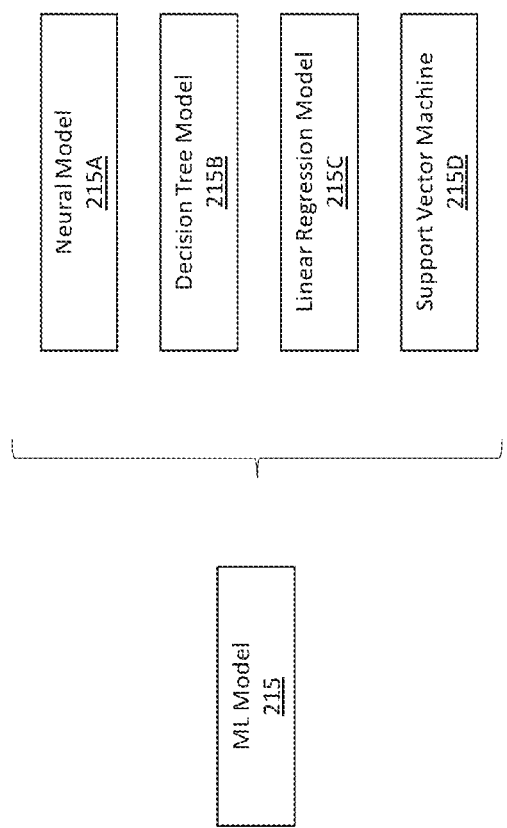

Any type of ML model or machine learning may be used. For instance, FIG. 2B illustrates how the ML model 215 from FIG. 2A may be implemented using different types of algorithms or models. In some embodiments, a machine learning algorithm may be trained to anonymize the microdata. As used herein, reference to "machine learning" or to a ML model may include any type of machine learning algorithm or device, neural network 215A (e.g., convolutional neural network(s), multilayer neural network(s), recursive neural network(s), deep neural network(s), dynamic neural network(s), etc.), decision tree model(s) 215B (e.g., decision trees, random forests, and gradient boosted trees), linear regression model(s) 215C or logistic regression model(s), support vector machine(s) ("SVM") 215D, artificial intelligence device(s), generative adversarial networks (GANs), or any other type of intelligent computing system. Any amount of training data may be used (and perhaps later refined) to train the machine learning algorithm to dynamically perform the disclosed operations.

The disclosed ML model generates synthesized data by performing a number of operations, some of which are illustrated in FIG. 1B. For instance, the ML model is configured to perform an act (act 105A) of reproducing (e.g., within the synthesized data) identified attributes that are identified from within the microdata. Examples of attributes include, but certainly are not limited to, age, gender, race, ethnic origin, country of citizenship, residence (e.g., country, state, municipality, zip code, area code, etc.), field of work or occupation, marital status, family status, level of education, driver's license state, and so forth, without limit. Indeed, any attribute may be used. Some embodiments refrain from using specific types of PII, such as unique identifiers (e.g., social security numbers, license numbers, phone numbers, etc.) because those numbers are typically unique to only a single individual or entity. Some embodiments do use some types unique PII, but those embodiments utilize an attribute generalizing function that uses only coarse information (e.g., the coarse-grained information of a zip code). Some embodiments also quantize continuous attributes into discrete groups or buckets. By way of example, an age attribute can be grouped into buckets (e.g., an age bucket of 18-30 years of age). Doing so helps reduce the number of possible unique combinations.

For instance, suppose the microdata describes 1,000 different people. Perhaps, in this example, 56% of the 1,000 people are female; 43% hold a graduate degree while 56% hold a bachelor's degree, 8% live within the same state, and 35% are of the same race. The ML model is able to identify these attributes from within the microdata and then symbolically reproduce those attributes within the synthesized data.

As described earlier, however, it is desirable to preserve privacy. As such, the ML model applies a set of constraints (act 105B) to prevent rare combinations of the attributes from being reproduced in the synthesized data. To clarify, the embodiments utilize machine learning to anonymize the microdata in view of certain predefined constraints that operate to ensure full anonymization of the microdata. It is this coupling of machine learning anonymization with the implementation of constraints that is unique and that provides substantial benefits.

For instance, one will appreciate how the machine learning can be viewed as creating a noisier version of the sensitive microdata where the records are skewed to introduce noise. In accordance with the disclosed principles, certain constraints are also imposed to further help on the privacy front. For instance, rare combinations of attributes up to certain lengths are filtered or prevented from being included in the resulting synthesized data, and short combinations of attributes in the synthesized data are ensured to also be common or present in the sensitive microdata.

If a malicious entity is able to acquire some background information, traditional systems may allow that malicious entity to comb and refine anonymized data and make inferences regarding the data. By applying constraints on rare attribute combinations, however, the disclosed embodiments are able to actively prevent such malicious actions from generating results. To facilitate such an operation, the embodiments are able to apply a rarity threshold to attribute combinations. That is, so-called "rare" combinations of attributes are combinations that are determined to satisfy a rarity threshold within the microdata. An example will be helpful.

Using the example from before, suppose there exists only three of the 1,000 records having the following attributes: female, age 16, resident of Washington state, no siblings, and Polynesian descent. If no constraints were imposed on the synthesized data, then it may be possible to apply attribute filters to the synthesized data using these five attributes. The filtering would produce only a small fraction of matching records. If a malicious entity had some background information, then it may be the case that the malicious entity could make an inference as to who is included in the resulting data set.

Advantageously, the ML model not only anonymizes the microdata, but the ML model also applies constraints so that so-called "rare" attribute combinations are refrained or prevented from being included in the resulting synthesized data set. Of course, the rarity threshold can be set to any threshold value. For instance, the rarity threshold may require at least a certain number of records be included as a result of any number of attribute combinations (e.g., as a result of combining a certain number of attributes, the rarity threshold may require 10, 15, 20, 25, 30, 35, 40, 45, 50, or more than 50 records to be included in the resulting data set). Additionally, or alternatively, the rarity threshold may require at least a certain percentage of the total original data set be included in the resulting data set in order to display the results.

FIG. 2A provides a useful illustration of these operations. For instance, the ML model 215 in FIG. 2A is shown as taking the microdata 205 as input and then applying a set of constraints 220, which are representative of the constraints discussed earlier. The ML model 215 anonymizes the microdata 205 to thereby generate the synthesized data 225, which is representative of the synthesized data discussed thus far. As shown, the synthesized data 225 still reflects attributes 210B, which correspond to the attributes 210A that are embodied within the microdata 205. Notably, however, as a part of generating the synthesized data 225, the ML model 215 ensures that each record in the synthesized data 225 is decoupled from any specific individual person or entity who may be represented within the microdata 205.

In some embodiments, a parameter 230 is used to control how many times an individual attribute is required to appear in the microdata 205 before that attribute is reproduced in the synthesized data 225. For instance, if a particular attribute is embodied in less than a threshold number of records, as defined by the parameter 230, then that particular attribute may not be reproduced within the synthesized data 225.

Figure 3:
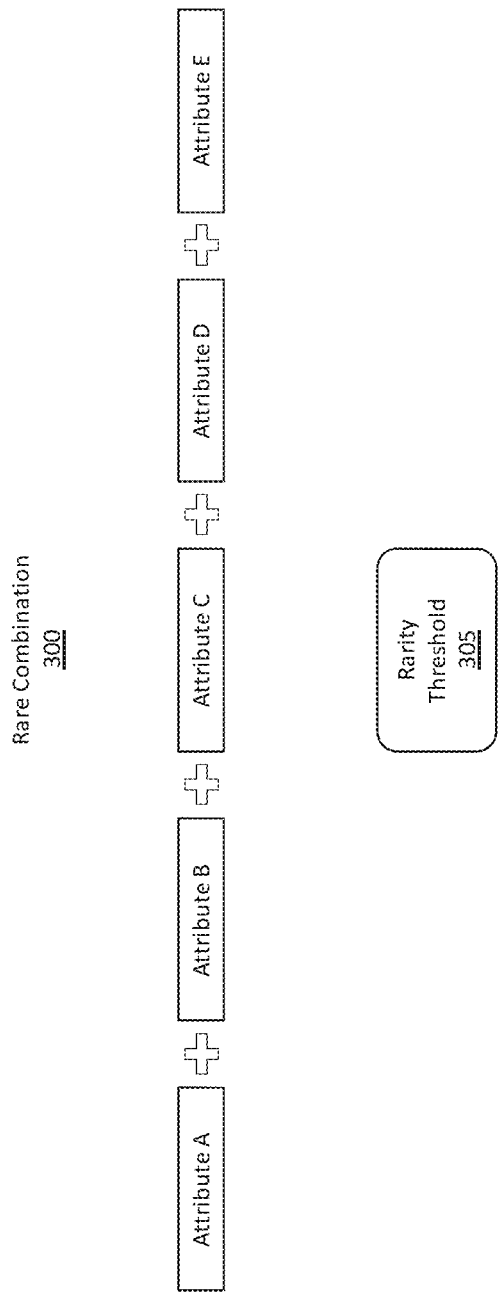
FIG. 3 illustrates how the machine learning model is able to apply different constraints so that rare combinations of attributes embodied within the microdata may be suppressed or prevented from being included, or at least identified, within the resulting synthetic data.

Additionally, as described earlier, the disclosed embodiments help preserve privacy by applying the constraints 220 to prevent rare attribute combinations from being included in the synthesized data 225. FIG. 3 provides a useful illustration of this concept.

In particular, FIG. 3 shows an example of a rare combination 300. In this example, rare combination 300 is formed by the combination of Attribute A, Attribute B, Attribute C, Attribute D, and Attribute E. Of course, this is just an example and other combinations or numbers of combinations may be used. The combination of these five different attributes results in a rare combination 300 that satisfies a rarity threshold 305, which is representative of the rarity threshold mentioned in connection with method 100.

In some cases, the rarity threshold 305 (included as a part of the constraints mentioned earlier) operates to restrict which attributes, or rather which combination of attributes, are reproduced or included in the synthetic data. Of course, this rarity threshold 305 may be set to any value, without limit.

Returning to FIG. 1B, the ML model may be configured to perform another operation when anonymizing the microdata to generate the synthesized data. Specifically, the ML model can perform an act (act 105C) of ensuring that all released attribute combinations of a particular length in the synthesized data also exist in the microdata. By way of example, say combinations of 2 or perhaps 3 attributes are present in the synthesized data. The ML model, when generating the synthesized data, performs a check or an assurance that such a short combination of attributes is also present in the microdata. Doing so helps to prevent analysts from making incorrect inferences about the existence of relationships that do not actually exist.

That is, some embodiments are configured to tightly control (e.g., via the constraints described herein) the release of shorter combinations of attributes. In doing so, it is possible to effectively remove or take away building blocks that would be used to create longer and more rare combinations of attributes. As a consequence, the availability of longer and more rare combinations is diminished given the constraints applied to short combinations, and it is therefore possible to quantify the amount of privacy leakage.

For instance, based on all the rare combinations in the sensitive microdata set for each combination length, it is possible to determine what is the percentage of rare combinations (or of each combination length) that leaks into the synthesized data, and it is possible to average that leakage across the whole data set to produce a leakage value. Based on tests and analysis, it has been found that the leakage value is quite low (e.g., less than 4% in some datasets, some results show leakage peaking at 1.9% for combinations of length 15 and 0.45% across all combinations for the same dataset) and can be controlled to be even lower via the constraints described herein. The above statistics are for example purposes only; indeed, the statistics for datasets may vary widely. In practical terms, even if a malicious entity has identified a combination that is rare in the real world, there exists only a small possibility (less than 4%) that the malicious entity will be able to link the rare combination to an actual person or entity.

Accordingly, the ML model is able to perform a number of operations to anonymize microdata in order to generate the synthesized data. To recap, in some embodiments, the approach used by the machine learning includes modeling and predicting data attributes. As discussed earlier, it is beneficial to protect the reproduction of attribute combinations according to k-synthetic data constraints, so the disclosed approaches are free to model each attribute in its entirety (rather than through cross-sampling or differential privacy probes) and to use the sensitive data (rather than an empty table) as a starting point for synthesis. This process is summarized in the following manner:

Step 1. The ML model extracts synthetic data constraints. From the sensitive data (i.e. the microdata), the ML model extracts all short common attribute combinations, where a "short" combination is a combination having a length less than or equal to a predetermined value and a count greater than or equal to another predetermined value. These short common attribute combinations form the building blocks of synthetic records, and longer rare attribute combinations (i.e. those having lengths less than or equal to a selected value (e.g., perhaps the value of 1) and counts less than a predetermined value) are prevented from being reproduced in the synthetic records.

Step 2. The ML model prepares a synthetic data table by creating the initial synthetic data table as a copy of the sensitive data table. The ML model suppresses all attribute values occurring less than a certain number of times in a column by replacing with a null value.

Step 3. The ML model prioritizes column prediction order. For each column, the ML model builds a decision tree classifier to predict that column from all other columns and to sum the probability mass of the most probable classes. This represents the 'viscosity' of the column, or resistance to change through random resampling. The ML model then sorts the columns for resampling in decreasing viscosity order to encourage more variation in more naturally variable columns.

Step 4. The ML model resamples the columns. For each column in order, the ML model builds a decision tree classifier to predict that column from all other columns in the evolving synthetic data table and to use it to resample that column in place.

Step 5. The ML model suppresses invalid combinations. To do so, the ML model sorts columns for suppression in increasing viscosity order. For instance, for each column, the ML model extracts all combinations of attributes of all columns up to and including the current column. If any of these is a rare combination or a short non-common combination, for each row containing that combination, the ML model suppresses one attribute of the combination at random with probabilities weighted by column viscosities. This has the effect of focusing suppression on the least variable (i.e. more potentially identifying) columns.

Step 6. The model outputs synthesized data (e.g., k-synthetic microdata file), returns the synthetic data columns to their original order, shuffles rows, and outputs the data (e.g., perhaps to a CSV file).

Figure 4:
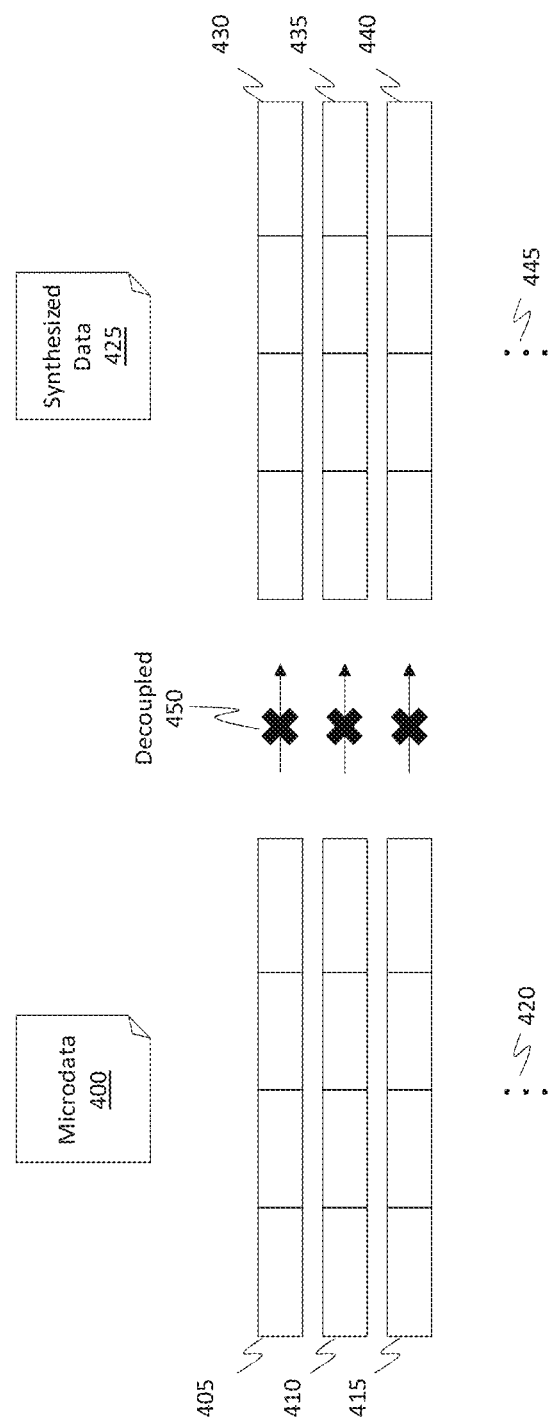
FIG. 4 illustrates how each row or record of synthetic data is decoupled from records included in the microdata.

FIG. 4 provides another useful illustration regarding the relationship between microdata and synthesized data in accordance with the disclosed principles.

Specifically, FIG. 4 shows a set of microdata 400, which is representative of the microdata mentioned thus far. This microdata 400 includes any number of records (shown as rows in FIG. 4). For instance, microdata 400 includes a first record 405, a second record 410, and a third record 415. The ellipsis 420 symbolically represents how the microdata 400 may include any number of records, even thousands, millions, or any number. In this particular example, each row record is shown as including four different attributes (e.g., each column may represent a corresponding attribute for that record). The attributes may be the same or they may be different.

As described earlier, the disclosed ML model is able to generate synthesized data 425, which is representative of the synthesized data discussed thus far, based on the microdata 400. Similar to the microdata 400, the synthesized data 425 may also include a number of row records, as shown by the first record 430, the second record 435, and the third record 440. The ellipsis 445 symbolically represents how any number of records may be included in the synthesized data 425.

Notably, each row record in the synthesized data 425 is decoupled or uncorrelated to any particular row record in the microdata 400. For instance, the record 430 is decoupled 450 from the record 405. The other records (435 and 440) are similarly decoupled 450 from the records 410 and 415. By way of further clarification, no single record in the synthesized data 425 is directly mapped or associated with any specific record in the microdata 400. That said, the combination of the synthesized data 425 embody similar attributes to the attributes embodied within the microdata 400. To clarify, there is a statistical correlation in the attributes present in the microdata 400 and the attributes reproduced within the synthesized data 425.

Figure 5:
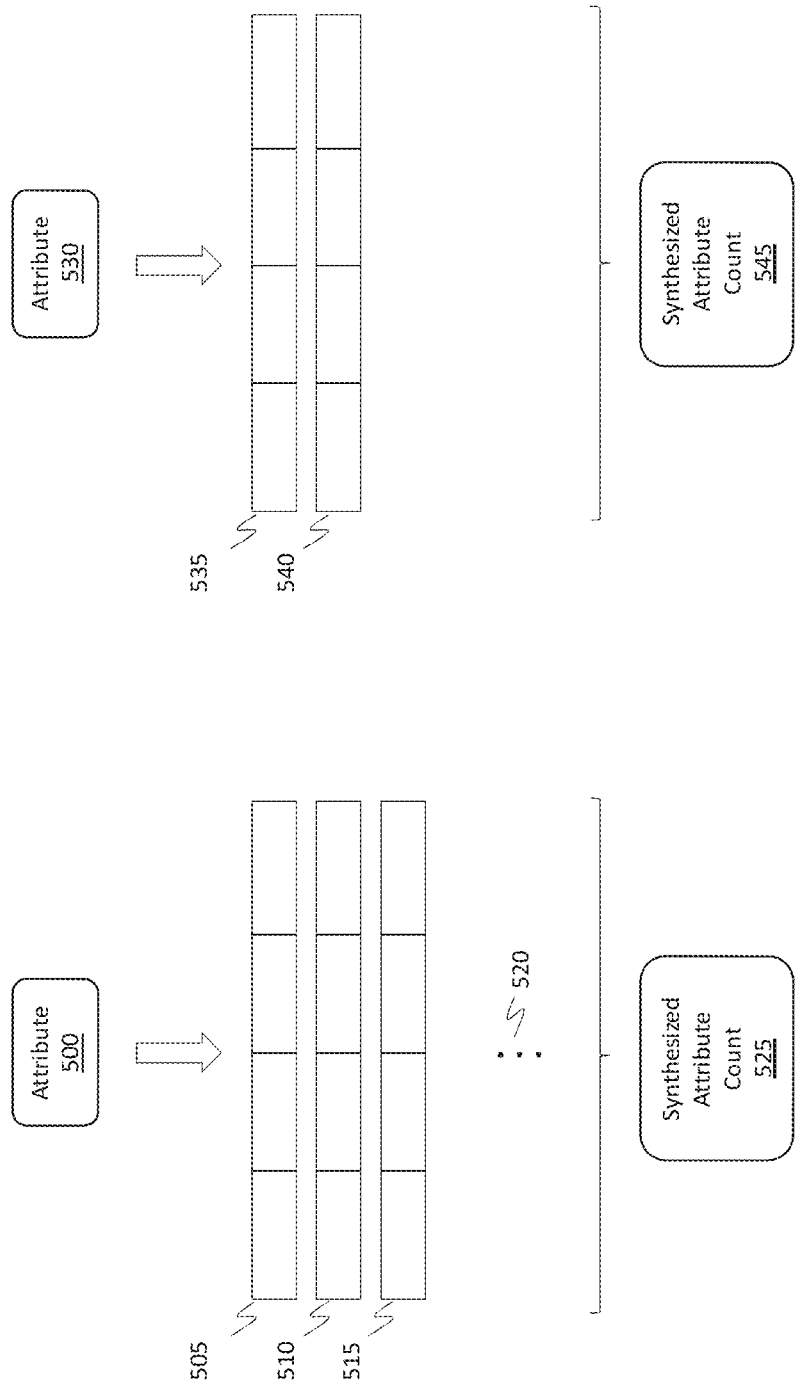
FIG. 5 illustrates how the records in the microdata may embody any number of different attributes.

Another example will be helpful. FIG. 5 shows how records in the synthesized data may portray, include, or embody a particular attribute. To illustrate, FIG. 5 shows an attribute 500. In this example, record 505, record 510, and record 515 all embody or include that particular attribute 500. The ellipsis 520 shows how any number of additional (or fewer) records may also embody that same attribute. In some cases, the embodiments count the number of records having a particular attribute (e.g., attribute 500) and generate a synthesized attribute count. For instance, synthesized attribute count 525 represents the number of records (in this case, at least three) embodying the attribute 500. As used herein, a "count" refers to the number of records included in a resulting dataset, which may be generated based on filtering an original dataset using one or more attributes to produce the resulting dataset.

FIG. 5 shows another example. Specifically, for attribute 530, only two records (e.g., record 535 and record 540) embody that attribute 530. Consequently, synthesized attribute count 545 will reflect how only two records embody attribute 530. In this regard, the embodiments are able to determine counts indicating how many records each attribute may be associated with.

Returning to FIG. 1A, method 100 continues with an act (act 110) where, within a user interface (UI), the embodiments are able to receive user input selecting (e.g., from among multiple different available attributes that are displayed in the UI some of which may be grouped under a common head attribute) specific attributes. When these one or more attributes are selected, they operate to filter the synthesized data to thereby generate a subset of data records. Notably, each record in the subset of data records embodies whichever attributes are selected, whether it is the case that only a single attribute is displayed or selected or it is the case that a combination of attributes are selected. For instance, if three attributes are selected, then the records included in the resulting data set all embody a combination of the three selected attributes. If no attributes have been selected, then the user interface may, by default, display counts for attributes that are currently being displayed. Further detail regarding the functionality of this user interface will be provided later.

Suppose a head attribute (e.g., "Registration Year") includes at least three sub-attributes (e.g., "2018," "2017," and "2016"). Some embodiments are focused on an implementation in which selection of multiple attributes under the same head attribute acts as an intersection/AND operation in which each record embodies the combination of the selected attributes. Some embodiments, however, are focused on an implementation in which selection of multiple attributes under the same head attribute acts as a union/OR operation in which each record embodies at least one of the selected attributes. By way of example, in some implementations, selection of multiple sub-attributes within the same head attribute shows counts for all of those sub-attributes combined. In a preferred embodiment, selection is restricted to allow only one selection per head attribute since it reduces the combinatorial growth dramatically, as will be discussed later.

Method 100 then continues with an act (act 115) of displaying, within the UI, a resulting synthesized aggregate count that is representative of a number of records included in the subset of data records. For instance, with reference to FIG. 5, the synthesized attribute count 525 provided a count regarding the number of records embodying the attribute 500. In the situation described by act 115, it may be the case that one or potentially multiple different attributes have been selected. As a result of this selection, the synthesized data is filtered so that only records embodying the selected attributes remain. Each one of these records corresponds or reflects the combination of the selected attributes. The resulting synthesized aggregate count then provides an indication regarding how many records reflect the combination of these selected attributes. Further detail regarding this feature will be provided later when the UI is discussed in more detail.

Operating in parallel with the acts 105, 110, and 115, method 100 includes some additional acts that may be performed to help improve the confidence of statistics derived from the microdata. To clarify, the timing as to when one or more of these additional acts is performed may not necessarily be dependent on the timing of acts 105, 110, and 115, unless so specified.

As shown in FIG. 1A, method 100 includes an act (act 120) of accessing a set of pre-computed microdata aggregate counts that indicate how many records in the microdata embody specific ones of the attributes or embody specific selected combinations of the attributes. To clarify, while the synthesized data does provide numerous insights regarding the trends and patterns embodied within the microdata, by itself, the synthesized data is somewhat limited in its practical use.

For instance, it is often the case that an analyst has no real understanding of how closely that synthesized data approximates the actual microdata. By way of example, suppose an analyst is tasked with reporting about the prevalence of human trafficking. It is highly beneficial to provide the analyst with some kind of baseline reportable numbers that are known to be correct so that the synthesized data can be compared against the baseline numbers to determine the precision and accuracy of the synthesized data. The pre-computed aggregate counts operate as these guiding baseline numbers. Additionally, the pre-computed aggregate counts are pre-computed in an effort to restrict subsequent access to the microdata so that the microdata cannot be maliciously accessed via hacking techniques used over the wire (e.g., traffic sniffing).

Figure 6:
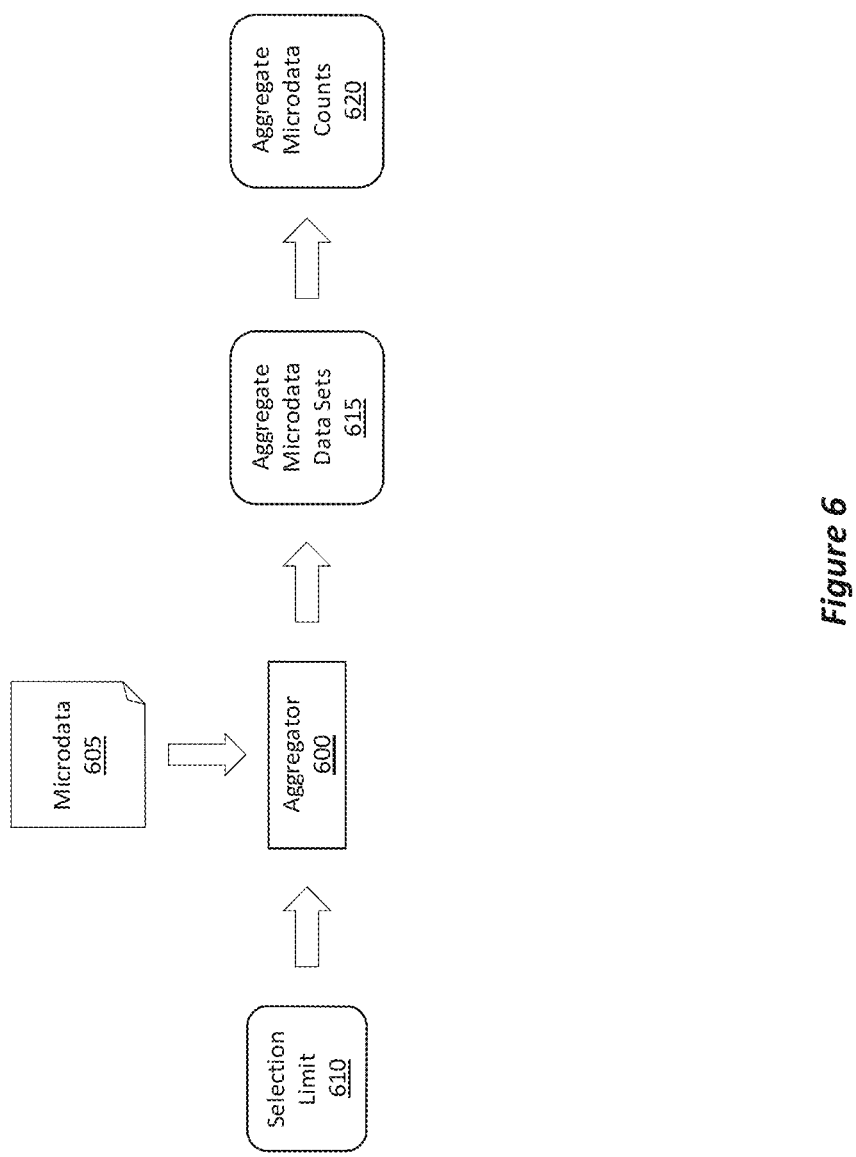
FIG. 6 illustrates how an aggregator is able to generate any number of pre-computed aggregate data sets and counts.
Figure 7:
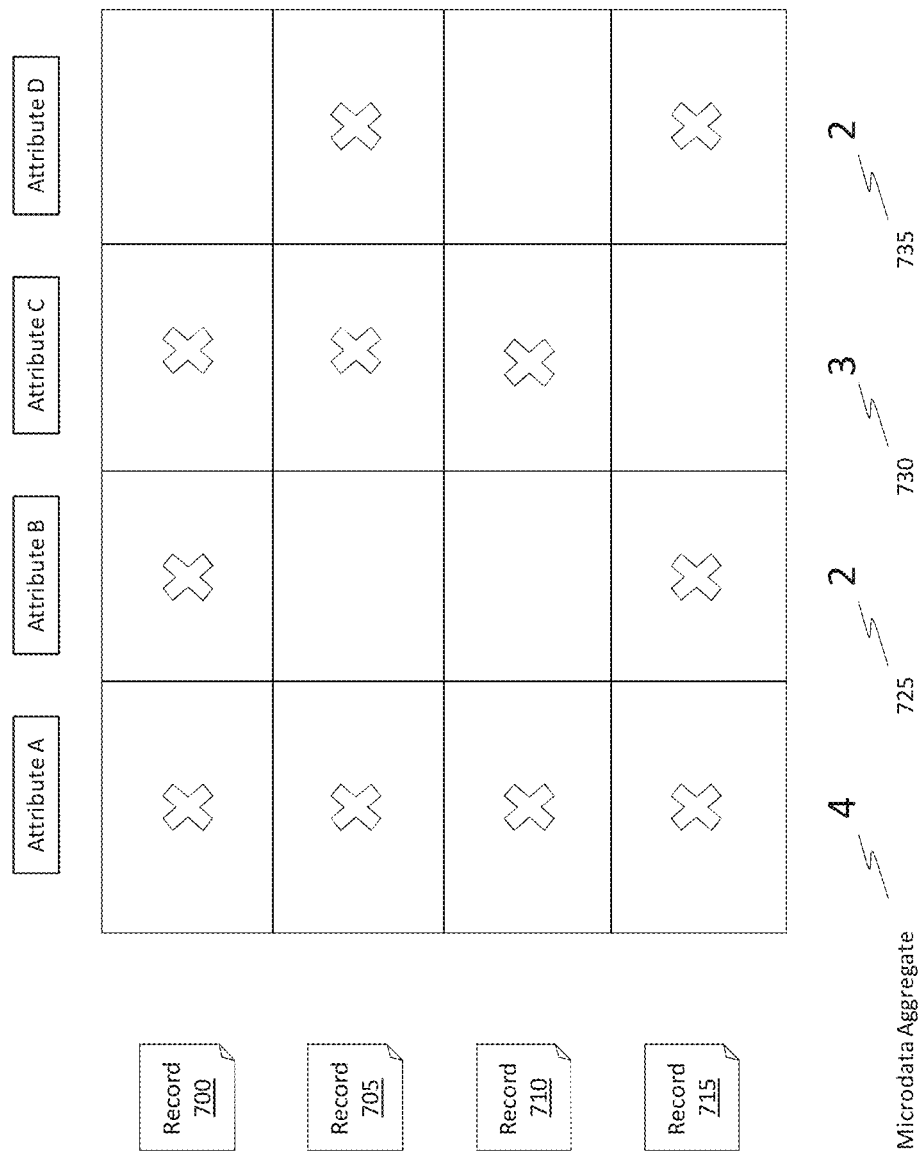
FIG. 7 illustrates how each record or row in the aggregate data sets may also embody different attributes.

For instance, each time the actual microdata is queried, a portion of the so-called "disclosure limit" (i.e. the cumulative impact that occurs from executing a series of queries against a dataset) can be thought of as being "spent," so by performing an initial computation to determine all of the aggregate counts, the disclosed embodiments beneficially reduce how much of the disclosure limit is spent overall. To clarify, subsequent operations for determining counts are executed against the pre-computed aggregate counts as opposed to submitting queries against the microdata. Accordingly, the disclosed embodiments provide these beneficial baseline values in the form of the pre-computed microdata aggregate counts. FIGS. 6 and 7 provide some helpful illustrations regarding this aspect.

FIG. 6 shows an aggregator 600 that is able to receive, as input, microdata 605, which is representative of the microdata discussed thus far, as well as a selection limit 610. The aggregator 600 determines how many records of the microdata 605 embody each one attribute. The aggregator 600 also determines how many records embody each combination of two attributes. The aggregator 600 also determines how many records embody each combination of three attributes. The aggregator 600 also determines how many records embody each combination of four attributes. This process may continue until the selection limit 610 is reached, where the selection limit 610 delineates how many combinations of attributes are permitted to be combined and analyzed by the aggregator 600. In this regard, the selection limit 610 influences how many of the pre-computed aggregate counts are to be computed. In practical terms, the selection limit 610 is one less than the maximum combination length calculated because the aggregate values that are displayed are for the missing values whose selection would complete the given combination. This point will be made more clear when the UIs are introduced.

In some embodiments, the aggregator 600 pre-computes all of the counts of cases that are determined to be of interest based on past historical usage of similar data. For instance, suppose three attributes A, B, and C are available for combination in the microdata. Further suppose the selection limit is set to three. Based on the selection limit, the combinations of all possible attributes are as follows: A, AB, AC, B, BC, C, and ABC, resulting in seven total combinations. Now suppose, however, that based on past historical usage of similar data, the attribute C is never considered or is considered less than a threshold consideration amount.

Based on this circumstance, the aggregator 600 can determine that for the current scenario, there is a low likelihood (or a likelihood less than a threshold likelihood bar or value) that C will be used. As such, the aggregator 600 can refrain from computing counts for combinations of attributes that include C. The resulting combinations would therefore be A, AB, and B, resulting in only three total combinations and resulting in substantially less computations being performed. Because the combinations of attributes grow combinatorially or factorially, it is highly beneficial to utilize techniques for potentially reducing the number of combinations that are computed. In this regard, the disclosed embodiments are able to improve the operational efficiency of the computer by refraining from computing counts for certain attribute combinations based on past historical usage of similar data.

By way of another example and not limitation, suppose the selection limit 610 were set to be four, then the aggregator 600 would determine various different microdata aggregate counts for all of the different possible combinations of attributes up to and including the limit of five attributes being combined. As described earlier, for a selection limit of 4, the embodiments compute combinations of length 5 (i.e. one more than the limit amount) so that after making 4 selections, the user interface can show the user the counts that would be obtained by making the fifth selection. This concept can be represented in the following manner: {selections made by user up to selection limit} {remaining attribute value} {count of record containing remaining attribute value}. The computations can be performed by counting the records N matching a combination C of length L and then for each sub-combination SC of length L−1 (missing attribute A), the following is reported: {SC} {A} {N}. In some cases, {C} {A} {N} are also reported for each attribute A in C so that the aggregator shows the correct counts for each selected attribute.

Here, the microdata aggregate counts would include (i) a respective count detailing how many records embody each attribute, (ii) a respective count detailing how many records embody each combination of two attributes, (iii) a respective count detailing how many records embody each combination of three attributes, and (iv) a respective count detailing how many records embody each combination of four attributes. Of course, the selection limit 610 may be set to any value. When setting the value, however, one will appreciate how the resulting number of counts may grow factorially.

To compute the counts, some embodiments cause the aggregator 600 to generate respective aggregate microdata data sets 615 corresponding to the different combinations of attributes up to the selection limit plus 1 for all records and by counting how many times each combination occurs. In practice, the selection limit is generally less than the lengths of the combinations checked for rarity purposes, so it is possible to produce the reportable aggregate counts as a side effect of computing rare combinations.

The embodiments may then compute the aggregate microdata counts 620 by counting the number of records in each data set included in the aggregate microdata data sets 615. To illustrate, a first data set may be created for attribute A, and one of the counts in the aggregate microdata counts 620 may reflect the number of records included in the first data set. A second data set may be created for attribute B, and another one of the counts in the aggregate microdata counts 620 may reflect the number of records included in the second data set. A third data set may be created for the combination of attribute A and attribute B, and another one of the counts in the aggregate microdata counts 620 may reflect the number of records included in the third data set. This process may continue until the selection limit 610 regarding the number of combinable attributes is reached.

Preserving privacy is of paramount importance, so it is desirable to safeguard the microdata 605 from potential breaches, including network sniffing attacks and other types of attacks. To provide these safeguards, some embodiments cause the aggregator 600 to have only a limited time period in which it is able to access the microdata 605. Once the time period is expired or once the pre-computed microdata aggregate counts are computed, then the aggregator 600's access to the microdata 605 may be restricted until a subsequent need to access the microdata 605 occurs. Once the restriction is in place, then data transmitted or used by the aggregator 600 may involve only the aggregate microdata counts 620 as opposed to any actual information extracted from the microdata 605, thereby safeguarding the microdata 605 from attacks.

FIG. 7 provides another useful illustration regarding the pre-computed microdata aggregate counts discussed thus far. The pre-computed microdata aggregate counts are referred to as being "pre-computed" because those counts may be computed any time relative to some of the other acts included in method 100. For instance, the pre-computed microdata aggregate counts may be computed before, after, or in parallel with act 105 of method 100 from FIG. 1A.

FIG. 7 shows a number of records, including record 700, 705, 710, and 715. While only four records are shown, one will appreciate how the disclosed principles may be expanded to cover any number of records without limit. The records 700-715 are records included within the microdata referenced herein.

FIG. 7 also shows Attributes A, B, C, and D. These attributes correspond to the attributes discussed herein. As shown by the table with the "x" marks in the boxes, record 700 embodies Attributes A, B, and C. Record 705 embodies Attributes A, C, and D. Record 710 embodies Attributes A and C. Record 715 embodies Attributes A, B, and D.

The microdata aggregate count 720 shows that there are four total records embodying Attribute A; these records include records 700, 705, 710, and 715. The microdata aggregate count 725 shows that there are two total records embodying Attribute B; these records include records 700 and 715. The microdata aggregate count 730 shows that there are three total records embodying Attribute C; these records include records 700, 705, and 710. The microdata aggregate count 735 shows that there are two total records embodying Attribute D; these records include records 705 and 715.

Although not shown, the embodiments are able to compute microdata aggregate counts for combinations of attributes as well. For instance, the microdata aggregate count for the combination of Attributes A and B would be two, where the count of two reflects record 700 and record 715. The microdata aggregate count for the combination of Attributes A and C would be three, where the count of three reflects records 700, 705, and 710. The microdata aggregate count for the combination of Attributes A and D would be two, where the count of two reflects records 705 and 715. Similarly, the microdata aggregate count for the combination of Attributes A, B, C, and D would be zero because none of the records 700, 705, 710, or 715 embody the combination of the four different attributes. The embodiments are able to determine counts until to the selection limit (e.g., 610 from FIG. 6) restricting how many attributes may be combined is reached. These counts are included in the set of pre-computed microdata aggregate counts described in method act 120 of method 100 in FIG. 1A. In practice, however, such low counts may actually be filtered out by a minimum reporting threshold, which will be discussed later in connection with FIG. 9.

Returning to FIG. 1A, method 100 includes an act (act 125) where, based on the user input referenced in act 110, the embodiments attempt to identify (e.g., from within the set of pre-computed microdata aggregate counts) a particular count corresponding to the selected specific attributes that were selected by the user input. Notably, the particular count reflects how many records of the microdata would remain if the same selected specific attributes were used to filter the microdata.

The embodiments perform an "attempt," as described above, because it may be the case that the user has selected a number of attribute combinations that surpass or exceed the selection limit 610 from FIG. 6. While the user can select any number of attributes to filter the synthesized data and to see the results of the filtering on the synthesized data, the number of pre-computed microdata aggregate counts is limited based on the selection limit described above. Here, an example will be helpful.

Suppose the selection limit was set to four. As described earlier, the embodiments pre-compute all the number of microdata aggregate counts for each combination of one or more attributes up to and including the limit of combinations of five attributes (i.e. four plus one or, in other words, the selection limit plus one). Now suppose the user selected a combination of five different attributes to be applied as a filter against the synthesized data. In this scenario, the user will be able to see the results of the filter against the synthesized data, but the user will not be able to see the results from the actual microdata because the selection limit restricted computing counts for combinations of attributes beyond four. Further detail will be presented later in connection with some of the UI figures.

Returning to FIG. 1A, upon a condition in which the particular count is identified, the embodiments display (act 130) the particular count simultaneously with the resulting synthesized aggregate count. As a consequence, the particular count is juxtaposed for comparison next to the resulting synthesized aggregate count in the UI. This position within the UI is specifically designed to address the problems in the technical field because this position within the UI helps to facilitate juxtaposed comparison to determine how closely the resulting synthesized aggregate count correlates to or matches the particular count. If no pre-computed microdata aggregate count is available, then only the synthesized aggregate is displayed. Optionally, appropriate visual components could read both datasets (i.e. the aggregate and the synthesized) to show the precomputed actual values while they exist. A benefit of the disclosed approach is that it works with all existing visualization components/libraries that assume microdata as input, avoiding the need to create new versions of all standard visuals (bar charts, pie charts, scatterplots, etc.).

From the above disclosure, one will appreciate how the embodiments provide, on the one hand, a structure (i.e. the synthesized data) capable of being explored deeply and freely and, on the other hand, a list of values (i.e. the pre-computed microdata aggregate counts) that are reported accurately for juxtaposed comparison.

By way of additional clarification, the embodiments enable or promote the visual exploration (e.g., applying attribute filters) of the synthetic data structure using the approximate shape of all the distributions of the different attributes that are of interest while simultaneously, behind the scenes, working out what it is that has been selected so that actual counts from the other table (i.e. the pre-computed microdata aggregate counts) corresponding to the user's selection can be displayed so the two values (i.e. the synthesized aggregate count and the corresponding count obtained from the pre-computed microdata aggregate count) can be displayed to allow comparison.

Examples User Interfaces

Figure 8:
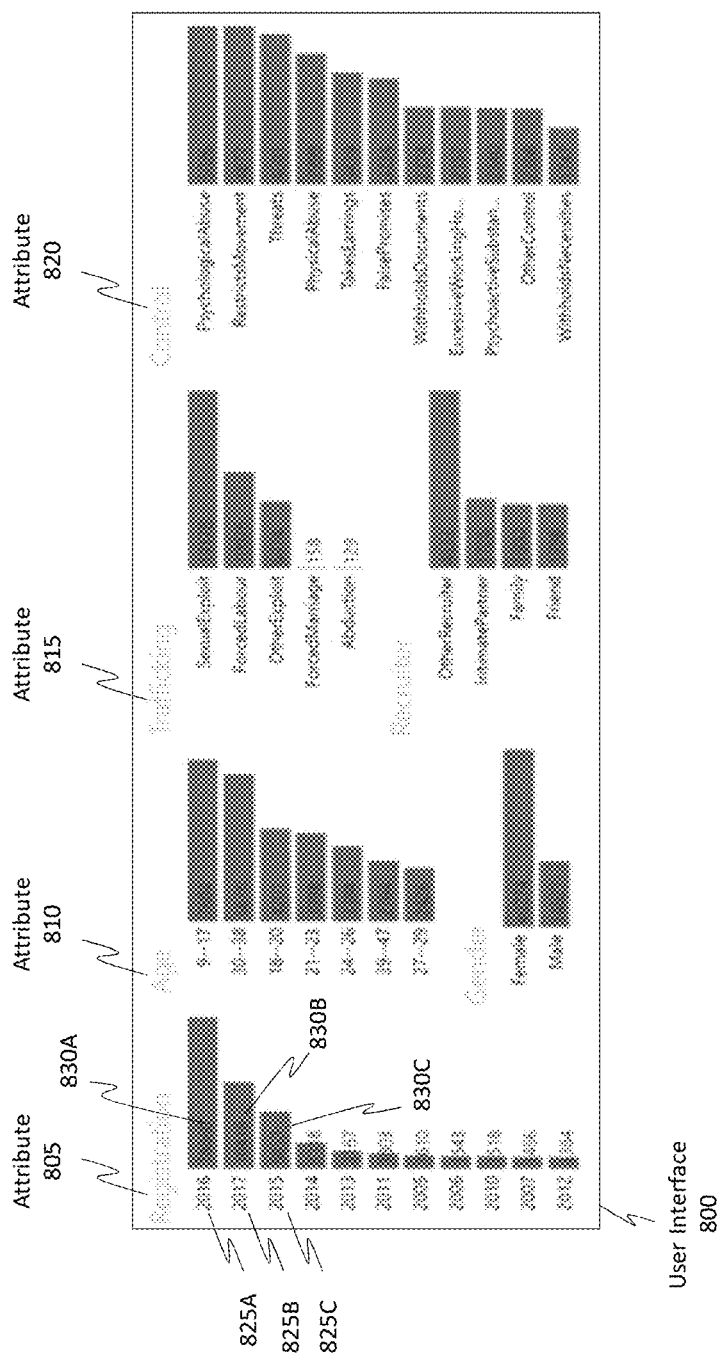
FIG. 8 illustrates an example of a user interface that is structured or configured to display synthetic data counts for each of a number of different attributes.

Attention will now be directed to FIGS. 8 through 12, which illustrate different examples of user interfaces that may be used to facilitate the method 100. FIG. 8 shows an example user interface 800 that is currently displaying a number of different attributes for a dataset associated with human trafficking. Specifically, this dataset was designed to identify attributes regarding how victims are targeted, exploited, and/or potentially abducted. Some of these attributes include attribute 805 (i.e. "Registration"), attribute 810 (i.e. "Age"), attribute 815 (i.e. "Trafficking"), and attribute 820 (i.e. "Control"), all of which may be considered as "head" attributes. Of course, these are examples of attributes only and should not be viewed as being limited or binding for the disclosed principles. Additionally, other attributes are illustrated but not labeled (e.g., "Gender" and "Recruiter").

Associated with each head attribute, there are a number of subfields or sub-attributes (hereinafter also referred to generally as "attributes" as well) that are selectable. When selected, these attributes operate as filters that are applied against the synthesized data previously generated. For instance, user interface 800 is currently showing that for attribute 825A (i.e. the year "2016" for the "Registration" attribute), there is a count 830A of 18,860 records embodying that particular attribute in the synthesized data. Similarly, for attribute 825B (i.e. the year "2017" for the "Registration" attribute), there is a count 830B of 10,416 records embodying that particular attribute in the synthesized data. For attribute 825C (i.e. the year "2015" for the "Registration" attribute), there is a count 830C of 6,853 records embodying that particular attribute in the synthesized data.

User interface 800 also shows corresponding bars or bar charts for each one of the listed attributes, where those bars are sized relative to the other bars. For instance, the bar corresponding to the count 830A has a length that is relatively longer than the bar corresponding to the count 830B because count 830A is higher than count 830B. Additionally, in some embodiments, the user interface 800 visually displays the actual value for each count. For instance, user interface is visually displaying the value 18,860 of the count 830A at a location proximate, and in some cases overlapping in full or in part, the corresponding bar for count 830A.

In this particular example, the organization of each sub-attribute (e.g., the years 2016, 2017, and so on) under the primary, main, or head attribute (e.g., "Registration") are organized or sorted based on value, where the largest value is sorted to be at the top of a list while the lowest value is sorted to be at the bottom of the list. For instance, the year 2012 is associated with a count of 1,384 while the year 2016 is associated with a count of 18,860. Other factors may be used to sort the attributes, however, and are not necessarily limited by value. For instance, the attributes may be sorted by alphanumeric name, a determined priority, or any other sorting schema.

Although not labeled, the other attributes (e.g., attributes 810, 815, and 820) are also displayed with corresponding sub-attributes and corresponding counts. By way of additional clarity, the counts currently displayed in user interface 800 correspond to counts computed for the synthesized data; these counts are not the counts computed as a part of the pre-computed microdata aggregate counts discussed earlier.

Figure 9:
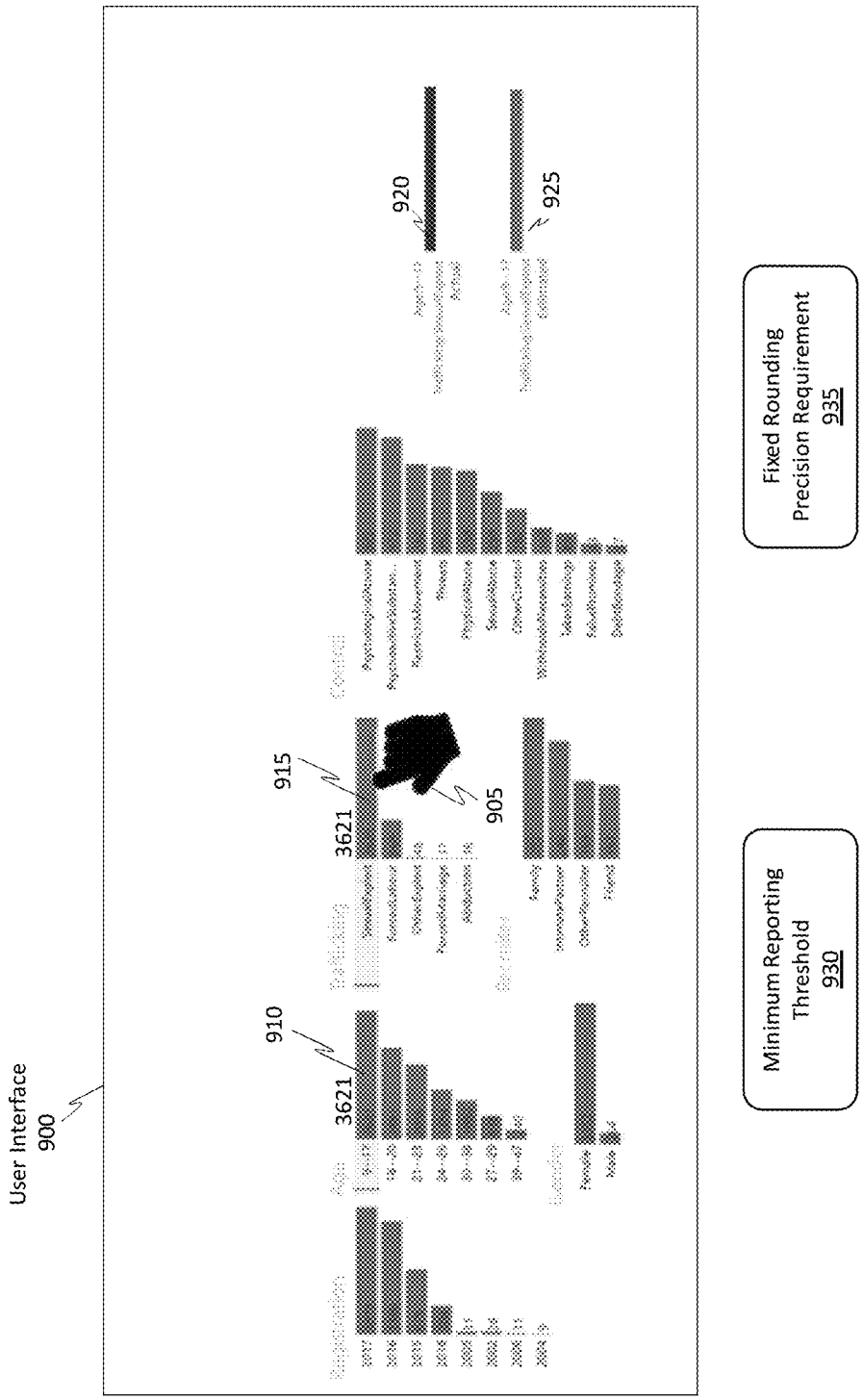
FIG. 9 illustrates another example of a user interface configured to display counts for different selected attributes.

FIG. 9 illustrates an example user interface 900 that is representative of the user interface 800 from FIG. 8. Here, however, user input 905 has been received selecting the attribute 910 (i.e. Age "9-17") and attribute 915 (i.e. Trafficking "SexualExploit"), as was described in method act 110 in FIG. 1A.

In response to this selection, the embodiments have applied the combination of those two attributes (i.e. attributes 910 and 915) to operate as filters against the synthesized data. Whereas previously the count for the Age 9-17 attribute was 7,604 and the count for the Trafficking SexualExploit attribute was 19,178 as shown in FIG. 8, the operation of filtering the synthesized data using the combination or union of these two attributes shows how there are now only 3,621 records embodying the combination of those two attributes. The number 3,621 was reproduced in FIG. 9 next to each one of the bar charts for the Age 9-17 attribute and the Trafficking SexualExploit attribute.

Some embodiments also display counts for the remaining attributes with the condition that the other attribute was also inherently selected. For instance, under the Registration 2017 attribute, the user interface 900 shows that there were 1,379 records having the combination of Age 9-17, Trafficking SexualExploit, and Registration 2017. Similarly, under the Registration 2016 attribute, the user interface 900 shows that there were 1,180 records having the combination of Age 9-17, Trafficking SexualExploit, and Registration 2016. As another example, under the Gender Female attribute, the user interface 900 shows that there were 3,357 records having the combination of Age 9-17, Trafficking SexualExploit, and Gender Female. In this regard, upon user selection of one or more of the attributes displayed in the user interface 900, the counts for the remaining attributes will be updated to reflect combinations of any selected attributes combined (inherently) with each respective attribute displayed in the user interface 900.

If the resulting count has a value of zero, then that attribute may not be displayed. For instance, FIG. 8 shows an attribute of Registration 2012 having a count of 1,384. After selection of the Age 9-17 attribute and the Trafficking SexualExploit attribute in FIG. 9, however, the resulting user interface 900 shows that there are no records included within the combination of Age 9-17, Trafficking SexualExploit, and Registration 2012. As such, the user interface 900 refrains from displaying a count when the value of that count is zero.

In addition to displaying the resulting counts for the various combinations of attributes of the synthesized data, the embodiments also display counts for the actual microdata using the set of pre-computed microdata aggregate counts. To clarify, the embodiments also display an actual count of records included in the microdata that would remain if the same selected attributes were used to filter the microdata. Notably, however, if the actual count falls under a so-called "minimum reporting threshold" (to be discussed in more detail later), then that count will not be displayed, even if it is a non-zero number.

By way of illustration, user interface 900 shows a bar 920 representative of the actual number of records included in the microdata that embody the combination of the Age 9-17 and the Trafficking SexualExploit attributes. As shown in FIG. 9, there are 3,670 records embodying the combination of these two attributes, where the count 3,670 is displayed at a location proximate to the bar 920. Additionally, user interface 900 displays a bar 925 representative of the number of records included in the synthesized data that embody the combination of Age 9-17 and the Trafficking SexualExploit attributes. As discussed earlier, there are 3,621 synthetic records embodying the combination of these two attributes, where the count 3,621 is displayed at a location proximate to the bar 925. Additionally, the bar 925 is displayed simultaneously and proximately to the bar 920 to facilitate juxtaposed comparison to determine how closely the synthesized aggregate count (i.e. the value 3,621) correlates to or matches the actual microdata aggregate count (i.e. the value 3,670).

Notably, the value of the resulting synthesized aggregate count (3,621) is 98.67% the value of the actual microdata aggregate count (i.e. the value 3,670). This close correlation means that statistics derived using the synthesized data should very closely represent the actual microdata. Consequently, analysts can have a high confidence that the resulting statistics based on the synthesized data represent true, actual, or real trends or patterns embodied within the microdata.

Accordingly, the user interfaces discussed thus far (e.g., user interfaces 800 and 900 from FIGS. 8 and 9, respectively) are examples of privacy-preserving user interfaces that display data related to "synthetic microdata" (i.e. the synthesized data) in which individual records do not represent actual people, but collectively preserve the structure and statistics of the underlying sensitive dataset (i.e. the microdata). The disclosed user interfaces are also configured to allow interactive data analysis.

As described herein, an initial interface template is provided for privacy-preserving analysis of synthetic microdata or so-called "synthesized data," which is supported by aggregate data derived from the sensitive dataset (i.e. the so-called "microdata"). The same template may be bound to data files generated by the disclosed methods and data pipeline, which may use a distributed machine learning for data synthesis. User interface 800 of FIG. 8 corresponds to an interface with titles updated to reflect the target dataset, which in this case is the CTDC Global Dataset on victims of trafficking. As described earlier, user interface 800 includes a visual showing a synthetic data attribute (Gender) and counts of records matching each of its values (40,274 Female; 14,527 Male). The user interface 900 from FIG. 9 shows a panel comparing counts of synthetic records matching each attribute against the actual number retrieved from pre-computed aggregates, as shown by the bars 920 and 925.

FIG. 9 also shows a minimum reporting threshold 930 and a fixed rounding precision requirement 935. The use of the minimum reporting threshold 930 can address risks associated with small data sets that are produced from applying attributes as filters. For instance, the datasets used herein are privacy preserving because rows in the synthesized data do not represent actual individual entities and because the constraints mentioned earlier are applied to outputs generated as a result of applying attribute filters. Generally, the minimum reporting threshold 930 is triggered to ensure that resulting statistics associated with the pre-computed aggregate counts surpasses a minimum threshold for reporting.

By way of example, suppose as a result of the user selecting a certain combination of attributes, the actual count of records in the microdata embodying that selection is less than the minimum reporting threshold 930 (e.g., say the threshold is 10 and the aggregate count reflects a value of 8). In this case, the embodiments may restrict the actual count of records in the microdata from being displayed in order to preserve privacy by preventing the ability to make inferences when a small count (for the microdata) is displayed. With reference to FIG. 9, the bar 925 may be prevented from being displayed if the associated count is below the minimum reporting threshold 930. Notably, however, the embodiments still display metrics for the synthesized data; only the count metrics for the microdata is prevented from being displayed when the resulting count is less than the minimum reporting threshold 930. In some cases, other statistics may be displayed when the minimum reporting threshold 930 has not been met. For instance, these other statistics may be based on the pre-computed accuracy analysis such as a confidence interval or percentage errors for all similar counts that could be created by filtering. Accordingly, the minimum reporting threshold 930 controls whether counts related to the microdata are displayed, and, in order to be displayed, a value of that count is required to exceed the minimum reporting threshold 930.

Similarly, use of the fixed rounding precision requirement 935 enforces minimum measurable differences between different data sets of the same aggregation published overtime so that the count of records for the microdata is reported only to a given precision in an effort to preserve privacy. That is, the embodiments provide the ability to define the fixed rounding precision requirement 935 for the pre-computed microdata aggregate counts so that the embodiments can inform a user that the published count is within a specific precision to the actual value (e.g., within the closest 10 or the closest 20). In this regard, the actual count of records of the microdata, which actual count may be displayed in some situations, may be a modified count that is modified to satisfy the fixed rounding precision requirement 935 and may not be a true count. Instead, the count may be within a determined fixed rounding precision measurement relative to the true count. In some cases, a confidence interval is used to provide some statistical attributes about what the selection of attributes looks like in the actual microdata.

By way of additional clarification, suppose multiple reports are released over time. For instance, suppose one report includes 100 counts based on the combination of certain attributes and another report includes 103 counts based on certain attributes. It may be the case that these two large numbers, which vary slightly, may actually create a small difference (e.g., a difference of only three counts). Based on this small difference, it may be the case that a malicious entity could associate that small difference from the one month to the next month with a group of individuals or entities in the real world. Such a condition is undesirable, so the embodiments make use of this additional protection (i.e. the fixed rounding precision requirement 935) for releasing aggregate numbers to control or to prevent situations in which small differences in reporting occur over time. Accordingly, the microdata's corresponding count may be subjected to the fixed rounding precision requirement 935.

Figure 10:
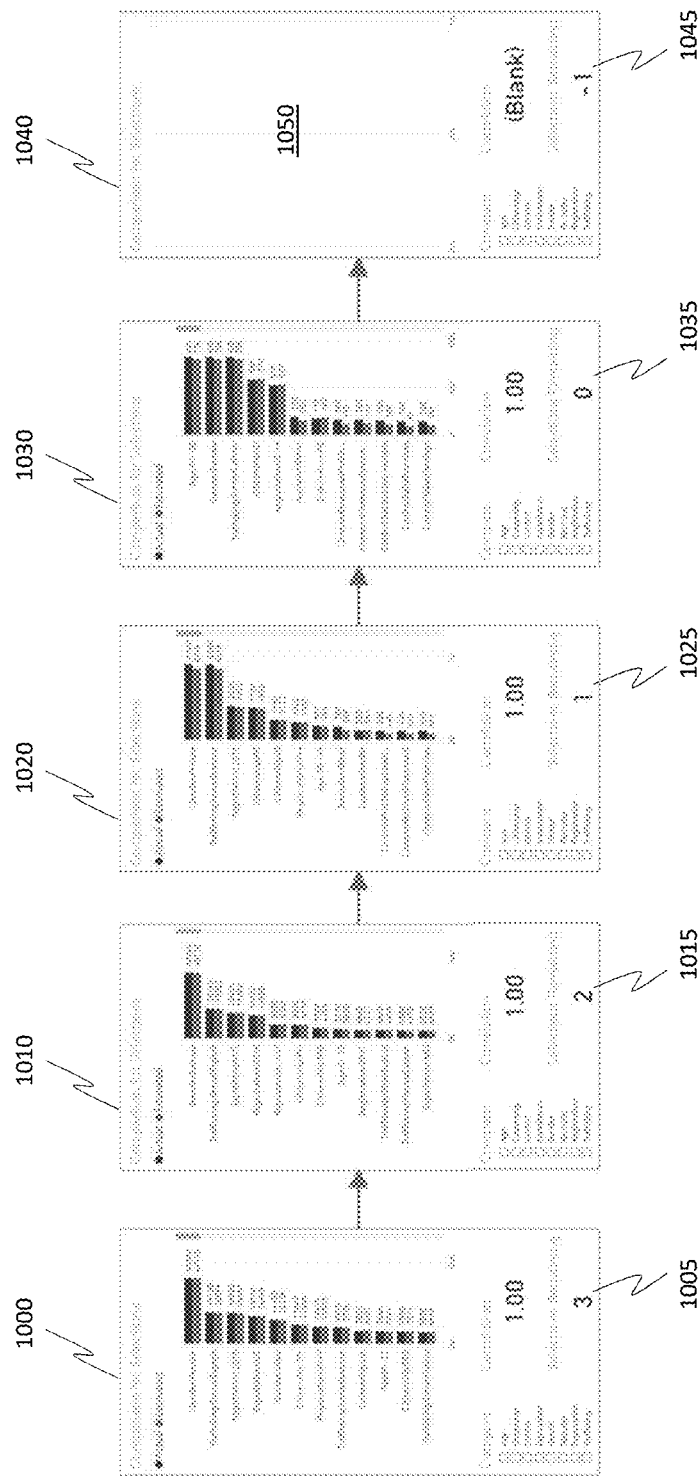
FIG. 10 illustrates how the user interface may be configured to receive user input that operates as filters for refining the data.

As was previously shown in FIG. 9 and now currently in FIG. 10, a user is able to successively make user selections to progressively filter the records of the synthetic dataset, with real-time comparison to actual reportable values. For instance, FIG. 10 shows a series of user interfaces that present data in response to user selections. These user interfaces display correlations between resulting synthesized aggregate counts and actual counts based on the microdata. Recall, the availability of the actual counts is based on the selection limit discussed in connection with FIG. 6. In this particular example of FIG. 10, the selection limit was set to 4, meaning that the user is able to select up to and including combinations of four different attributes and the user interface retains the ability to visually display corresponding actual microdata counts.

UI 1000 shows a scenario in which one attribute has been selected. As shown, the synthesized aggregate count is being displayed proximately to the actual microdata count in a similar manner as was shown in FIG. 9. Additionally, the selection remaining indicator 1005 shows that the user can select up to three more attributes to act as filtering.

UI 1010 shows a scenario in which a second attribute has been selected, resulting in the synthesized data being filtered based on the combination of two separate attributes. As shown, the synthesized aggregate count is being displayed proximately to the actual microdata count, which is based on the set of pre-computed aggregate counts. Additionally, the selection remaining indicator 1015 shows that the user can select up to two more attributes to act as filtering.

UI 1020 shows a scenario in which a third attribute has been selected, resulting in the synthesized data being filtered based on the combination of three separate attributes. As shown, the synthesized aggregate count is being displayed proximately to the actual microdata count, which is based on the set of pre-computed aggregate counts. Additionally, the selection remaining indicator 1025 shows that the user can select up to one more attribute to act as filtering.

UI 1030 shows a scenario in which a fourth attribute has been selected, resulting in the synthesized data being filtered based on the combination of four separate attributes. As shown, the synthesized aggregate count is being displayed proximately to the actual microdata count, which is based on the set of pre-computed aggregate counts. Additionally, the selection remaining indicator 1035 shows that, if the user were to proceed, then there will be no more actual counts available for display. In this regard, selections of attributes up to the selection limit will dynamically retrieve reportable values from the set of pre-computed microdata aggregate counts while selections of attributes beyond the selection limit will allow further exploration of only the synthetic data. That is, selections of attributes beyond the selection limit results in no pre-computed microdata aggregate counts being displayed in the UI.

To clarify, once the selection limit is exceeded, the user may need to either remove selections or to continue filtering only the synthetic data without comparison against the actual count of the microdata. UI 1040 shows how the panel 1050 is now empty and there are a negative number of selections available (see indicator 1045) for the actual counts. In this case, applying the selected filters resulted in a case in which none of the records in the synthesized data embodied the combination of the five attributes, so no synthesized aggregate count is displayed. If there was a record in the synthesized data embodying this combination of attributes, then a corresponding bar chart would be displayed, but no bar chart would be displayed to represent actual counts in the microdata because the limit has been exceeded for the actual microdata counts. Accordingly, the disclosed principles provide design contributions that enable both privacy and utility to be preserved while enabling greater access to the analysis of sensitive data.

As described earlier, some embodiments group sub-attributes under a same general head attribute (e.g., in FIG. 9, the "Age" head attribute included the following sub-attributes: 9-17, 18-20, 21-23, 24-26, 30-38, 27-29, and 39-47). Some embodiments restrict user selection to only a single sub-attribute included under the head attribute (e.g., only one of the age sub-attributes is selectable). Other embodiments, however, do not perform this kind of restriction and allow any number of selections under the same head attribute. Similar to the selections, computing the pre-computed aggregate counts may be limited in a similar manner. That is, some embodiments (though not all) may refrain from computing counts for combinations of attributes falling under the same head attribute.

Figure 11:
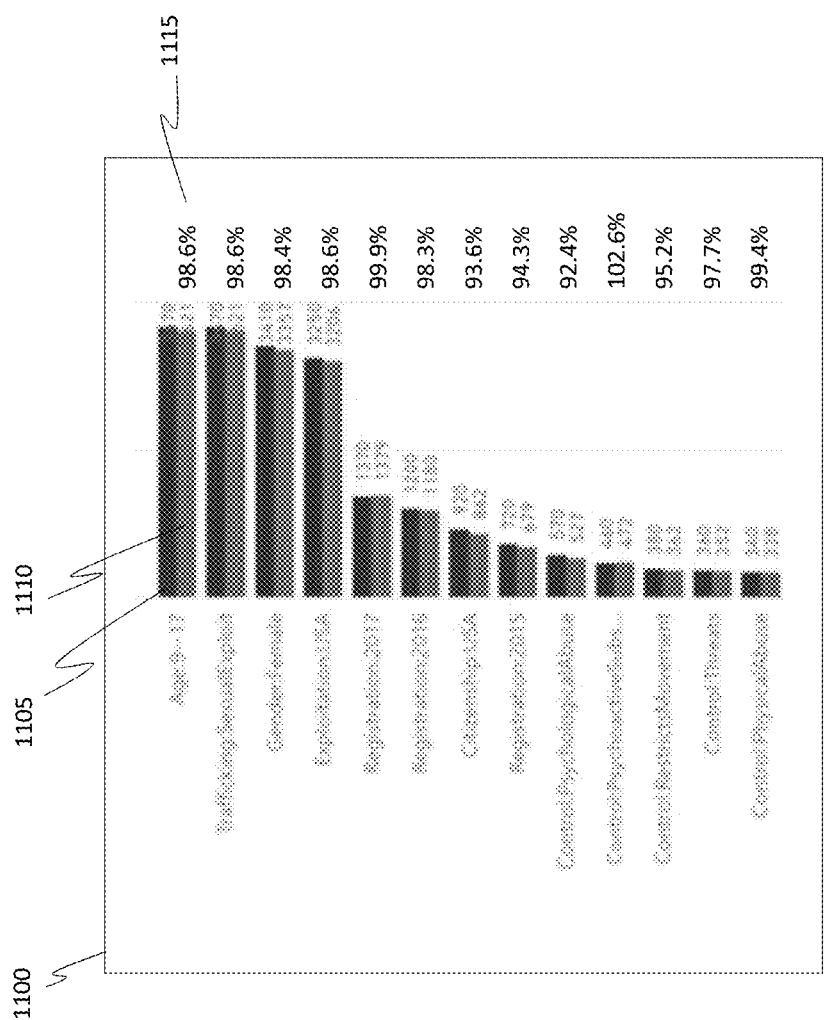
FIG. 11 illustrates how synthetic data counts can be juxtaposed next to actual data counts in order to provide assurances regarding the accuracy of the synthetic data relative to the actual data.

In some cases, as shown in FIG. 11, a user interface 1100, which is representative of the user interfaces discussed thus far, may visually represent not only a graphical correlation between the synthetic aggregate count and the actual count (e.g., as shown by the graphical bar 1105 and the bar 1110), but the user interface 1100 may also show a numeric correlation 1115. For instance, numeric correlation 1115 indicates the percentage or fractional difference between the two different counts. Here, the bar 1105 represents the actual count based on the microdata while the bar 1110 represents the synthesized aggregate count based on the synthesized data. The numeric correlation 1115 represents what percentage or fractional difference exists between the synthesized aggregate count and the actual count.

To illustrate, the synthesized aggregate count (in this example) is 3,621 while the actual count is 3,670. Dividing 3,621 by 3,670 shows that the synthesized aggregate count is 98.6% that of the actual count. Although not labeled, the user interface 1100 shows the relative percentages for some of the other attributes. Accordingly, in some embodiments, the UI displays the actual count as a first bar in a bar chart and the resulting synthesized aggregate count as a second bar in the bar chart, and the UI may further display a relative percentage correlation of the second bar relative to the first bar.

Figure 12:
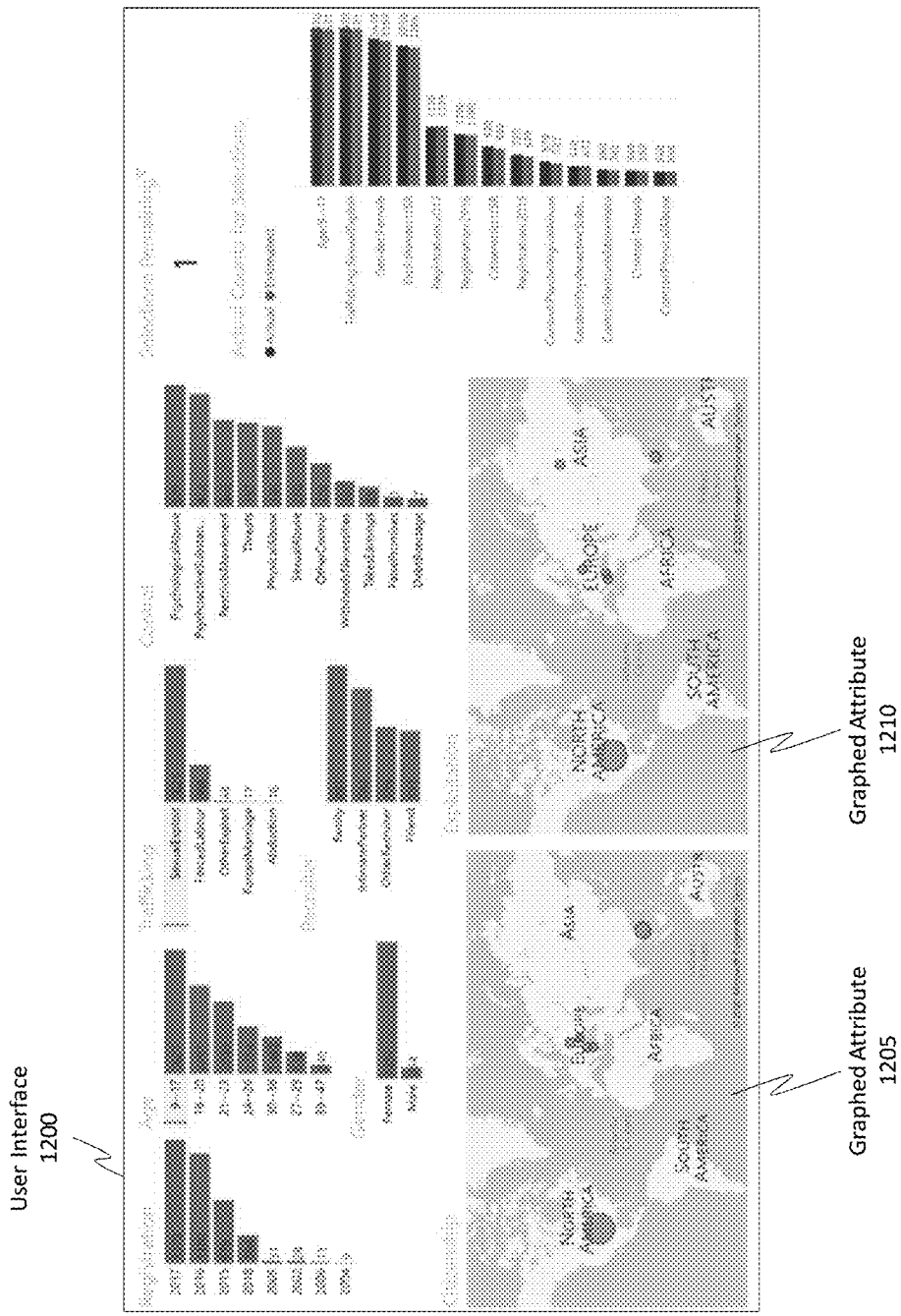
FIG. 12 illustrates another example user interface showing how metrics associated with attributes may be displayed in different ways.

FIG. 12 illustrates another example user interface 1200 configured to display graphical properties of some attributes. For instance, the graphed attribute 1205 corresponds to a "Citizenship" attribute, and the graphed attribute 1210 corresponds to an "Exploitation" attribute. Both of the graphed attributes 1205 and 1210 are visually displayed in the form of a map with circles representing counts at their respective geographic locations. The larger the circle, the higher the count. Of course, other kinds of visualizations may be used in place of a map and circles. For instance, lines charts, bar charts, pie charts, heat maps, histograms, area charts, Mosaic or Mekko charts, population pyramids, Gantt charts, waterfall charts, Venn diagrams, scatter plots, tree diagrams, sunburst charts, or any other type of visual display may be used.

Accordingly, the disclosed embodiments provide highly beneficial and synergistic techniques for anonymizing data while respecting certain pre-defined constraints. Doing so advancing a privacy preserving agenda. The disclosed embodiments also help improve confidence in accuracy metrics that are derived using synthetic data. That is, by following the disclosed principles, analysts can have greater confidence that metrics derived from the synthetic data correspond to real-world occurrences, conditions, events, or scenarios.

Additionally, it should be noted that the precomputed aggregate counts are not necessarily small or precise in order to provide an additional privacy protection. It is also possible to build new visual components that could be linked to both datasets (e.g., the aggregate counts and the synthetic counts) to show the aggregate counts while they exist and the synthetic counts otherwise. In some implementations, it is possible to compute the distribution of errors (e.g., mean absolute differences between counts) for binned counts of filtered records. By way of example, for counts of 100-200 filtered records, perhaps the mean error is 25%. This information could be used to supplement the synthetic counts, as could the confidence intervals and/or standard deviations derived from the same distribution.

Example Computer/Computer Systems

Figure 13:
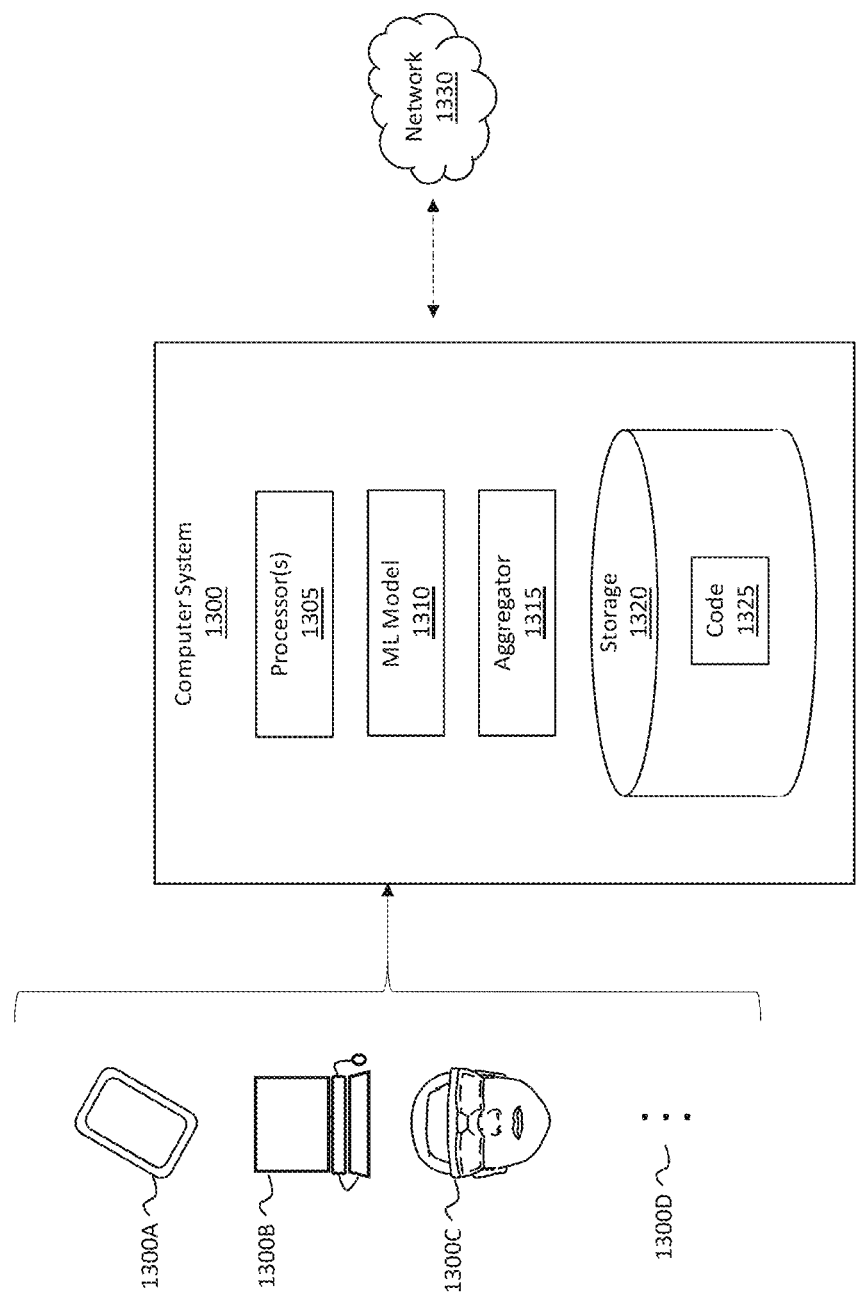
FIG. 13 illustrates an example computer system structured to be able to perform any of the disclosed operations and to include any of the disclosed engines, components, modules, or other features.

Attention will now be directed to FIG. 13 which illustrates an example computer system 1300 that may include and/or be used to perform any of the operations described herein. Computer system 1300 may take various different forms. For example, computer system 1300 may be embodied as a tablet 1300A, a desktop or laptop 1300B, a wearable device 1300C, a mobile device, a standalone device, or any other type of computing device as symbolized by the ellipsis 1300D. Computer system 1300 may also be a distributed system that includes one or more connected computing components/devices that are in communication with computer system 1300.

In its most basic configuration, computer system 1300 includes various different components. FIG. 13 shows that computer system 1300 includes one or more processor(s) 1305 (aka a "hardware processing unit"), a ML model 1310, an aggregator 1315, and storage 1320.

Regarding the processor(s) 1305, it will be appreciated that the functionality described herein can be performed, at least in part, by one or more hardware logic components (e.g., the processor(s) 1305). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

The ML model 1310 may be implemented as a specific processing unit (e.g., a dedicated processing unit as described earlier) configured to perform one or more specialized operations for the computer system 1300. The ML model 1310 is representative of the ML model 215 from FIG. 2A. Similarly, the aggregator 1315 is configured to perform the operations discussed earlier in connection with aggregator 600 from FIG. 6 and may also be implemented as a specific processing unit. As used herein, the terms "executable module," "executable component," "component," "module," "engine," "model," or "aggregator" can refer to hardware processing units or to software objects, routines, or methods that may be executed on computer system 1300. The different components, modules, engines, and services described herein may be implemented as objects or processors that execute on computer system 1300 (e.g. as separate threads).

Storage 1320 may be physical system memory, which may be volatile, non-volatile, or some combination of the two. The term "memory" may also be used herein to refer to non-volatile mass storage such as physical storage media. If computer system 1300 is distributed, the processing, memory, and/or storage capability may be distributed as well.

Storage 1320 is shown as including executable instructions 1325. The executable instructions 1325 represent instructions that are executable by the processor(s) 1305 (or perhaps even the ML model 1310 or the aggregator 1315) of computer system 1300 to perform the disclosed operations, such as those described in the various methods.

The disclosed embodiments may comprise or utilize a special-purpose or general-purpose computer including computer hardware, such as, for example, one or more processors (such as processor(s) 1305) and system memory (such as storage 1320), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, byway of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1300 may also be connected (via a wired or wireless connection) to external sensors (e.g., one or more remote cameras) or devices via a network 1330. For example, computer system 1300 can communicate with any number devices or cloud services to obtain or process data. In some cases, network 1330 may itself be a cloud network. Furthermore, computer system 1300 may also be connected through one or more wired or wireless networks 1330 to remote/separate computer systems(s) that are configured to perform any of the processing described with regard to computer system 1300.

A "network," like network 1330, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1300 will include one or more communication channels that are used to communicate with the network 1330. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system configured to facilitate improved confidence in an accuracy relating to statistics derived from synthetic data generated from microdata, said computer system comprising:
    one or more processors; and
    one or more computer-readable hardware storage devices that store computer-executable instructions that configure the computer system to at least:
        generate synthesized data by anonymizing microdata using a machine learning (ML) model, wherein the ML model generates the synthesized data by:
        reproducing, within the synthesized data, identified attributes that are identified from within the microdata, and
        applying a set of constraints that prevent rare combinations of the attributes from being reproduced in the synthesized data, said rare combinations of the attributes being combinations that satisfy a rarity threshold within the microdata;
        within a user interface (UI), receive user input selecting, from among the attributes, specific attributes that, when selected, filter the synthesized data to thereby generate a subset of data records, each record in the subset of data records embodying a combination of the selected specific attributes;
        display, within the UI, a resulting synthesized aggregate count that is representative of a number of records included in the subset of data records;
        access a set of pre-computed microdata aggregate counts that indicate how many records in the microdata embody specific ones of the attributes or embody specific selected combinations of the attributes;
        based on the user input, attempt to identify, from the set of pre-computed microdata aggregate counts, a particular count corresponding to the selected specific attributes, the particular count reflecting how many records of the microdata would remain if the same selected specific attributes were used to filter the microdata; and
        upon a condition in which the particular count is identified, display the particular count simultaneously with the resulting synthesized aggregate count, wherein the particular count is juxtaposed for comparison next to the resulting synthesized aggregate count in the UI to facilitate juxtaposed comparison to determine how closely the resulting synthesized aggregate count matches the particular count.

2. The computer system of claim 1, wherein, as a part of generating the synthesized data, the ML model ensures that each record in the synthesized data is decoupled from any specific individual entity who is represented within the microdata.

3. The computer system of claim 1, wherein a parameter is used to control how many times an individual attribute is required to appear in the microdata before being reproduced in the synthesized data.

4. The computer system of claim 1, wherein the particular count is subjected to a fixed rounding precision requirement.

5. The computer system of claim 1, wherein a selection limit influences how many of the pre-computed microdata aggregate counts are computed.

6. The computer system of claim 5, wherein selections of attributes up to the selection limit will dynamically retrieve reportable values from the set of pre-computed microdata aggregate counts while selections of attributes beyond the selection limit will allow further exploration of only the synthetic data.

7. The computer system of claim 6, wherein selections of attributes beyond the selection limit results in no pre-computed microdata aggregate counts being displayed in the UI.

8. The computer system of claim 1, wherein the computing system identifies the particular count corresponding to the selected specific attributes from the set of pre-computed microdata aggregate counts.

9. The computer system of claim 8, wherein a minimum reporting threshold controls whether the particular count is displayed, and wherein, in order to be displayed, a value of the particular count is required to exceed the minimum reporting threshold.

10. The computer system of claim 1, wherein the UI displays the particular count as a first bar in a bar chart and the resulting synthesized aggregate count as a second bar in the bar chart, and wherein the UI displays a relative percentage correlation of the second bar relative to the first bar.

11. A method for facilitating improved confidence in an accuracy relating to statistics derived from synthetic data generated from microdata, said method comprising:
    generating synthesized data by anonymizing microdata using a machine learning (ML) model, wherein the ML model generates the synthesized data by:
    reproducing, within the synthesized data, identified attributes that are identified from within the microdata, and
    applying a set of constraints that prevent rare combinations of the attributes from being reproduced in the synthesized data, said rare combinations of the attributes being combinations that satisfy a rarity threshold within the microdata;
    within a user interface (UI), receiving user input selecting, from among the attributes, specific attributes that, when selected, filter the synthesized data to thereby generate a subset of data records, each record in the subset of data records embodying a combination of the selected specific attributes;
    displaying, within the UI, a resulting synthesized aggregate count that is representative of a number of records included in the subset of data records;

accessing a set of pre-computed microdata aggregate counts that indicate how many records in the microdata embody specific ones of the attributes or embody specific selected combinations of the attributes;

based on the user input, attempting to identify, from the set of pre-computed microdata aggregate counts, a particular count corresponding to the selected specific attributes, the particular count reflecting how many records of the microdata would remain if the same selected specific attributes were used to filter the microdata; and upon a condition in which the particular count is identified, displaying the particular count simultaneously with the resulting synthesized aggregate count, wherein the particular count is juxtaposed for comparison next to the resulting synthesized aggregate count in the UI to facilitate juxtaposed comparison to determine how closely the resulting synthesized aggregate count matches the particular count.

12. The method of claim 11, wherein, as a part of generating the synthesized data, the ML model ensures so that each record in the synthesized data is decoupled from any specific individual entity who is represented within the microdata.

13. The method of claim 11, wherein a parameter is used to control how many times an individual attribute is required to appear in the microdata before being reproduced in the synthesized data.

14. The method of claim 11, wherein a minimum reporting threshold controls whether the particular count is displayed, and wherein, in order to be displayed, a value of the particular count is required to exceed the minimum reporting threshold.

15. The method of claim 11, wherein the particular count is subjected to a fixed rounding precision requirement.

16. The method of claim 11, wherein a selection limit influences how many of the pre-computed microdata aggregate counts are computed.

17. The method of claim 16, wherein selections of attributes up to the selection limit will dynamically retrieve reportable values from the set of pre-computed microdata aggregate counts while selections of attributes beyond the selection limit will allow further exploration of only the synthetic data.

18. The method of claim 17, wherein selections of attributes beyond the selection limit results in no pre-computed microdata aggregate counts being displayed in the UI.

19. One or more computer-readable hardware storage devices that store computer-executable instructions for configuring a computer system to at least:

generate synthesized data by anonymizing microdata using a machine learning (ML) model, wherein the ML model generates the synthesized data by:

reproducing, within the synthesized data, identified attributes that are identified from within the microdata, and applying a set of constraints that prevent rare combinations of the attributes from being reproduced in the synthesized data, said rare combinations of the attributes being combinations that satisfy a rarity threshold within the microdata;

within a user interface (UI), receive user input selecting, from among the attributes, specific attributes that, when selected, filter the synthesized data to thereby generate a subset of data records, each record in the subset of data records embodying a combination of the selected specific attributes;

display, within the UI, a resulting synthesized aggregate count that is representative of a number of records included in the subset of data records;

access a set of pre-computed microdata aggregate counts that indicate how many records in the microdata embody specific ones of the attributes or embody specific selected combinations of the attributes;

based on the user input, attempt to identify, from the set of pre-computed microdata aggregate counts, a particular count corresponding to the selected specific attributes, the particular count reflecting how many records of the microdata would remain if the same selected specific attributes were used to filter the microdata; and upon a condition in which the particular count is identified, display the particular count simultaneously with the resulting synthesized aggregate count, wherein the particular count is juxtaposed for comparison next to the resulting synthesized aggregate count in the UI to facilitate juxtaposed comparison to determine how closely the resulting synthesized aggregate count matches the particular count.

20. The one or more computer-readable hardware storage devices of claim 19, wherein, as a part of generating the synthesized data, the ML model ensures so that each record in the synthesized data is decoupled from any specific individual entity who is represented within the microdata, and wherein a parameter is used to control how many times an individual attribute is required to appear in the microdata before being reproduced in the synthesized data.

* * * * *